(12) United States Patent
Cao et al.

(10) Patent No.: US 11,327,504 B2
(45) Date of Patent: May 10, 2022

(54) METHOD, SYSTEM AND APPARATUS FOR MOBILE AUTOMATION APPARATUS LOCALIZATION

(71) Applicant: SYMBOL TECHNOLOGIES, LLC, Lincolnshire, IL (US)

(72) Inventors: Feng Cao, Burlington (CA); Harsoveet Singh, Mississauga (CA); Richard Jeffrey Rzeszutek, Toronto (CA); Jingxing Qian, Richmond Hill (CA); Jonathan Kelly, Toronto (CA)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/946,412

(22) Filed: Apr. 5, 2018

(65) Prior Publication Data
US 2019/0310652 A1 Oct. 10, 2019

(51) Int. Cl.
*G06Q 30/02* (2012.01)
*A63F 13/213* (2014.01)
(Continued)

(52) U.S. Cl.
CPC ......... *G05D 1/0268* (2013.01); *G01C 21/206* (2013.01); *G05D 1/024* (2013.01);
(Continued)

(58) Field of Classification Search
CPC .......... G05D 1/0268; G05D 1/00; G05D 1/02; G05D 1/0248; G06Q 30/06; G06Q 30/02;
(Continued)

(56) References Cited

U.S. PATENT DOCUMENTS

| 5,209,712 A | 5/1993 | Ferri |
| 5,214,615 A | 5/1993 | Bauer |

(Continued)

FOREIGN PATENT DOCUMENTS

| CA | 2835830 | 11/2012 |
| CA | 3028156 | 1/2018 |

(Continued)

OTHER PUBLICATIONS

Bazazian et al., "Fast and Robust Edge Extraction in Unorganized Point Clouds," IEEE, 2015 International Conference on Digital Image Computing: Techniques and Applications (DICTA), Nov. 23-25, 2015, pp. 1-8.

(Continued)

*Primary Examiner* — Yuri Kan, P.E.

(57) ABSTRACT

A method of mobile automation apparatus localization in a navigation controller includes: controlling a depth sensor to capture a plurality of depth measurements corresponding to an area containing a navigational structure; selecting a primary subset of the depth measurements; selecting, from the primary subset, a corner candidate subset of the depth measurements; generating, from the corner candidate subset, a corner edge corresponding to the navigational structure; selecting an aisle subset of the depth measurements from the primary subset, according to the corner edge; selecting, from the aisle subset, a local minimum depth measurement for each of a plurality of sampling planes extending from the depth sensor; generating a shelf plane from the local minimum depth measurements; and updating a localization of the mobile automation apparatus based on the corner edge and the shelf plane.

20 Claims, 14 Drawing Sheets

(51) Int. Cl.
 *G05D 1/02* (2020.01)
 *G06K 9/00* (2022.01)
 *G01C 21/20* (2006.01)
(52) U.S. Cl.
 CPC ....... *G05D 1/0246* (2013.01); *G06K 9/00664* (2013.01); *G05D 2201/0206* (2013.01)
(58) Field of Classification Search
 CPC ....... G06Q 30/0603; G06F 7/00; G06T 15/00; G06T 19/006; B25J 9/1689; B25J 9/1687; B25J 11/1009; G01S 17/42; H04N 1/00
 See application file for complete search history.

(56) References Cited

U.S. PATENT DOCUMENTS

| | | | |
|---|---|---|---|
| 5,408,322 | A | 4/1995 | Hsu et al. |
| 5,414,268 | A | 5/1995 | McGee |
| 5,534,762 | A | 7/1996 | Kim |
| 5,566,280 | A | 10/1996 | Fukui et al. |
| 5,953,055 | A | 9/1999 | Huang et al. |
| 5,988,862 | A | 11/1999 | Kacyra et al. |
| 6,026,376 | A | 2/2000 | Kenney |
| 6,034,379 | A | 3/2000 | Bunte et al. |
| 6,075,905 | A | 6/2000 | Herman et al. |
| 6,115,114 | A | 9/2000 | Berg et al. |
| 6,141,293 | A | 10/2000 | Amorai-Moriya et al. |
| 6,304,855 | B1 | 10/2001 | Burke |
| 6,442,507 | B1 | 8/2002 | Skidmore et al. |
| 6,549,825 | B2 | 4/2003 | Kurata |
| 6,580,441 | B2 | 6/2003 | Schileru-Key |
| 6,711,293 | B1 | 3/2004 | Lowe |
| 6,721,769 | B1 | 4/2004 | Rappaport et al. |
| 6,836,567 | B1 | 12/2004 | Silver et al. |
| 6,995,762 | B1 | 2/2006 | Pavlidis et al. |
| 7,090,135 | B2 | 8/2006 | Patel |
| 7,137,207 | B2 | 11/2006 | Armstrong et al. |
| 7,245,558 | B2 | 7/2007 | Willins et al. |
| 7,248,754 | B2 | 7/2007 | Cato |
| 7,277,187 | B2 | 10/2007 | Smith et al. |
| 7,373,722 | B2 | 5/2008 | Cooper et al. |
| 7,474,389 | B2 | 1/2009 | Greenberg et al. |
| 7,487,595 | B2 | 2/2009 | Armstrong et al. |
| 7,493,336 | B2 | 2/2009 | Noonan |
| 7,508,794 | B2 | 3/2009 | Feather et al. |
| 7,527,205 | B2 | 5/2009 | Zhu et al. |
| 7,605,817 | B2 | 10/2009 | Zhang et al. |
| 7,647,752 | B2 | 1/2010 | Magnell |
| 7,693,757 | B2 | 4/2010 | Zimmerman |
| 7,726,575 | B2 | 6/2010 | Wang et al. |
| 7,751,928 | B1 | 7/2010 | Antony et al. |
| 7,783,383 | B2 | 8/2010 | Eliuk et al. |
| 7,839,531 | B2 | 11/2010 | Sugiyama |
| 7,845,560 | B2 | 12/2010 | Emanuel et al. |
| 7,885,865 | B2 | 2/2011 | Benson et al. |
| 7,925,114 | B2 | 4/2011 | Mai et al. |
| 7,957,998 | B2 | 6/2011 | Riley et al. |
| 7,996,179 | B2 | 8/2011 | Lee et al. |
| 8,009,864 | B2 | 8/2011 | Linaker et al. |
| 8,049,621 | B1 | 11/2011 | Egan |
| 8,072,470 | B2 * | 12/2011 | Marks ................... A63F 13/213 345/632 |
| 8,091,782 | B2 | 1/2012 | Cato et al. |
| 8,094,902 | B2 | 1/2012 | Crandall et al. |
| 8,094,937 | B2 | 1/2012 | Teoh et al. |
| 8,132,728 | B2 | 3/2012 | Dwinell et al. |
| 8,134,717 | B2 | 3/2012 | Pangrazio et al. |
| 8,189,855 | B2 | 5/2012 | Opalach et al. |
| 8,199,977 | B2 | 6/2012 | Krishnaswamy et al. |
| 8,207,964 | B1 | 6/2012 | Meadow et al. |
| 8,233,055 | B2 | 7/2012 | Matsunaga et al. |
| 8,265,895 | B2 | 9/2012 | Willins et al. |
| 8,277,396 | B2 | 10/2012 | Scott et al. |
| 8,284,988 | B2 | 10/2012 | Sones et al. |
| 8,423,431 | B1 | 4/2013 | Rouaix et al. |
| 8,429,004 | B2 | 4/2013 | Hamilton et al. |
| 8,463,079 | B2 | 6/2013 | Ackley et al. |
| 8,479,996 | B2 | 7/2013 | Barkan et al. |
| 8,520,067 | B2 | 8/2013 | Ersue |
| 8,542,252 | B2 | 9/2013 | Perez et al. |
| 8,599,303 | B2 | 12/2013 | Stettner |
| 8,630,924 | B2 | 1/2014 | Groenevelt et al. |
| 8,660,338 | B2 | 2/2014 | Ma et al. |
| 8,743,176 | B2 | 6/2014 | Stettner et al. |
| 8,757,479 | B2 | 6/2014 | Clark et al. |
| 8,812,226 | B2 | 8/2014 | Zeng |
| 8,923,893 | B2 | 12/2014 | Austin et al. |
| 8,939,369 | B2 | 1/2015 | Olmstead et al. |
| 8,954,188 | B2 | 2/2015 | Sullivan et al. |
| 8,958,911 | B2 | 2/2015 | Wong et al. |
| 8,971,637 | B1 | 3/2015 | Rivard |
| 8,989,342 | B2 | 3/2015 | Liesenfelt et al. |
| 9,007,601 | B2 | 4/2015 | Steffey et al. |
| 9,037,287 | B1 | 5/2015 | Grauberger et al. |
| 9,064,394 | B1 | 6/2015 | Trundle |
| 9,070,285 | B1 | 6/2015 | Ramu et al. |
| 9,129,277 | B2 | 9/2015 | Macintosh |
| 9,135,491 | B2 | 9/2015 | Morandi et al. |
| 9,159,047 | B2 | 10/2015 | Winkel |
| 9,171,442 | B2 | 10/2015 | Clements |
| 9,205,562 | B1 * | 12/2015 | Konolige ............... B25J 9/1687 |
| 9,247,211 | B2 | 1/2016 | Zhang et al. |
| 9,329,269 | B2 | 5/2016 | Zeng |
| 9,349,076 | B1 | 5/2016 | Liu et al. |
| 9,367,831 | B1 | 6/2016 | Besehanic |
| 9,380,222 | B2 | 6/2016 | Clayton et al. |
| 9,396,554 | B2 | 7/2016 | Williams et al. |
| 9,400,170 | B2 | 7/2016 | Steffey |
| 9,424,482 | B2 | 8/2016 | Patel et al. |
| 9,517,767 | B1 | 12/2016 | Kentley et al. |
| 9,542,746 | B2 | 1/2017 | Wu et al. |
| 9,549,125 | B1 | 1/2017 | Goyal et al. |
| 9,562,971 | B2 | 2/2017 | Shenkar et al. |
| 9,565,400 | B1 | 2/2017 | Curlander et al. |
| 9,600,731 | B2 | 3/2017 | Yasunaga et al. |
| 9,600,892 | B2 | 3/2017 | Patel et al. |
| 9,612,123 | B1 | 4/2017 | Levinson et al. |
| 9,639,935 | B1 | 5/2017 | Douady-Pleven et al. |
| 9,697,429 | B2 | 7/2017 | Patel et al. |
| 9,766,074 | B2 | 9/2017 | Roumeliotis et al. |
| 9,778,388 | B1 | 10/2017 | Connor |
| 9,791,862 | B1 | 10/2017 | Connor |
| 9,805,240 | B1 | 10/2017 | Zheng et al. |
| 9,811,754 | B2 | 11/2017 | Schwartz |
| 9,827,683 | B1 | 11/2017 | Hance et al. |
| 9,880,009 | B2 | 1/2018 | Bell |
| 9,928,708 | B2 | 3/2018 | Lin et al. |
| 9,980,009 | B2 | 5/2018 | Jiang et al. |
| 9,994,339 | B2 | 6/2018 | Colson et al. |
| 10,019,803 | B2 | 7/2018 | Venable et al. |
| 10,111,646 | B2 | 10/2018 | Nycz et al. |
| 10,121,072 | B1 | 11/2018 | Kekatpure |
| 10,127,438 | B1 | 11/2018 | Fisher et al. |
| 10,197,400 | B2 | 2/2019 | Jesudason et al. |
| 10,210,603 | B2 | 2/2019 | Venable et al. |
| 10,229,386 | B2 | 3/2019 | Thomas |
| 10,248,653 | B2 | 4/2019 | Blassin et al. |
| 10,265,871 | B2 | 4/2019 | Hance et al. |
| 10,289,990 | B2 | 5/2019 | Rizzolo et al. |
| 10,336,543 | B1 | 7/2019 | Sills et al. |
| 10,349,031 | B2 | 7/2019 | DeLuca |
| 10,352,689 | B2 | 7/2019 | Brown et al. |
| 10,394,244 | B2 | 8/2019 | Song et al. |
| 2001/0041948 | A1 | 11/2001 | Ross et al. |
| 2002/0006231 | A1 | 1/2002 | Jayant et al. |
| 2002/0097439 | A1 | 7/2002 | Braica |
| 2002/0146170 | A1 | 10/2002 | Rom |
| 2002/0158453 | A1 | 10/2002 | Levine |
| 2002/0164236 | A1 | 11/2002 | Fukuhara et al. |
| 2003/0003925 | A1 | 1/2003 | Suzuki |
| 2003/0094494 | A1 | 5/2003 | Blanford et al. |
| 2003/0174891 | A1 | 9/2003 | Wenzel et al. |
| 2004/0021313 | A1 | 2/2004 | Gardner et al. |
| 2004/0131278 | A1 | 7/2004 | Imagawa et al. |

(56) References Cited

U.S. PATENT DOCUMENTS

| | | |
|---|---|---|
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0213082 A1 | 9/2005 | DiBernardo et al. |
| 2005/0213109 A1 | 9/2005 | Schell et al. |
| 2006/0032915 A1 | 2/2006 | Schwartz |
| 2006/0045325 A1 | 3/2006 | Zavadsky et al. |
| 2006/0106742 A1 | 5/2006 | Bochicchio et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0323121 A1 | 12/2009 | Valkenburg et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0241289 A1 | 9/2010 | Sandberg |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0216063 A1 | 9/2011 | Hayes |
| 2011/0242286 A1 | 10/2011 | Pace et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0019393 A1 | 1/2012 | Wolinsky et al. |
| 2012/0022913 A1 | 1/2012 | VolKmann et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0307108 A1 | 6/2012 | Forutanpour |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197464 A1* | 8/2012 | Wang ............... B25J 9/1689 701/2 |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0142421 A1 | 6/2013 | Silver et al. |
| 2013/0144565 A1 | 6/2013 | Miller et al. |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahem et al. |
| 2013/0235165 A1 | 9/2013 | Gharib et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi et al. |
| 2014/0003655 A1 | 1/2014 | Gopalakrishnan et al. |
| 2014/0003727 A1 | 1/2014 | Lortz et al. |
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0098094 A1 | 4/2014 | Neumann et al. |
| 2014/0100813 A1 | 4/2014 | Shaowering |
| 2014/0104413 A1 | 4/2014 | McCloskey et al. |
| 2014/0129027 A1 | 5/2014 | Schnittman |
| 2014/0156133 A1 | 6/2014 | Cullinane et al. |
| 2014/0192050 A1 | 7/2014 | Qiu et al. |
| 2014/0195374 A1 | 7/2014 | Bassemir et al. |
| 2014/0214547 A1 | 7/2014 | Signorelli et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0300637 A1 | 10/2014 | Fan et al. |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0032252 A1* | 1/2015 | Galluzzo ............. B25J 15/0608 700/218 |
| 2015/0039458 A1 | 2/2015 | Reid |
| 2015/0088618 A1 | 3/2015 | Basir et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |

(56) References Cited

U.S. PATENT DOCUMENTS

| | | | |
|---|---|---|---|
| 2015/0170256 A1* | 6/2015 | Pettyjohn | G06Q 30/0639 |
| | | | 705/14.49 |
| 2015/0181198 A1 | 6/2015 | Baele et al. | |
| 2015/0212521 A1 | 7/2015 | Pack et al. | |
| 2015/0245358 A1 | 8/2015 | Schmidt | |
| 2015/0262116 A1 | 9/2015 | Katircioglu et al. | |
| 2015/0279035 A1 | 10/2015 | Wolski et al. | |
| 2015/0298317 A1 | 10/2015 | Wang et al. | |
| 2015/0352721 A1 | 12/2015 | Wicks et al. | |
| 2015/0363625 A1 | 12/2015 | Wu et al. | |
| 2015/0363758 A1 | 12/2015 | Wu et al. | |
| 2015/0379704 A1 | 12/2015 | Chandrasekar et al. | |
| 2016/0026253 A1 | 1/2016 | Bradski et al. | |
| 2016/0044862 A1 | 2/2016 | Kocer | |
| 2016/0061591 A1 | 3/2016 | Pangrazio et al. | |
| 2016/0070981 A1 | 3/2016 | Sasaki et al. | |
| 2016/0092943 A1 | 3/2016 | Vigier et al. | |
| 2016/0012588 A1 | 4/2016 | Taguchi et al. | |
| 2016/0104041 A1 | 4/2016 | Bowers et al. | |
| 2016/0107690 A1 | 4/2016 | Oyama et al. | |
| 2016/0112628 A1 | 4/2016 | Super et al. | |
| 2016/0114488 A1 | 4/2016 | Mascorro Medina et al. | |
| 2016/0129592 A1 | 5/2016 | Saboo et al. | |
| 2016/0132815 A1 | 5/2016 | Itoko et al. | |
| 2016/0150217 A1 | 5/2016 | Popov | |
| 2016/0156898 A1 | 6/2016 | Ren et al. | |
| 2016/0163067 A1 | 6/2016 | Williams et al. | |
| 2016/0171336 A1 | 6/2016 | Schwartz | |
| 2016/0171429 A1 | 6/2016 | Schwartz | |
| 2016/0171707 A1 | 6/2016 | Schwartz | |
| 2016/0185347 A1 | 6/2016 | Lefevre et al. | |
| 2016/0191759 A1 | 6/2016 | Somanath et al. | |
| 2016/0253735 A1 | 9/2016 | Scudillo et al. | |
| 2016/0253844 A1 | 9/2016 | Petrovskaya et al. | |
| 2016/0271795 A1 | 9/2016 | Vicenti | |
| 2016/0313133 A1 | 10/2016 | Zeng et al. | |
| 2016/0328618 A1 | 11/2016 | Patel et al. | |
| 2016/0353099 A1 | 12/2016 | Thomson et al. | |
| 2016/0364634 A1 | 12/2016 | Davis et al. | |
| 2017/0004649 A1 | 1/2017 | Collet Romea et al. | |
| 2017/0011281 A1 | 1/2017 | Dijkman et al. | |
| 2017/0011308 A1 | 1/2017 | Sun et al. | |
| 2017/0032311 A1 | 2/2017 | Rizzolo et al. | |
| 2017/0041553 A1 | 2/2017 | Cao et al. | |
| 2017/0066459 A1 | 3/2017 | Singh | |
| 2017/0074659 A1 | 3/2017 | Giurgiu et al. | |
| 2017/0150129 A1 | 5/2017 | Pangrazio | |
| 2017/0193434 A1 | 7/2017 | Shah et al. | |
| 2017/0219338 A1 | 8/2017 | Brown et al. | |
| 2017/0219353 A1 | 8/2017 | Alesiani | |
| 2017/0227645 A1 | 8/2017 | Swope et al. | |
| 2017/0227647 A1 | 8/2017 | Baik | |
| 2017/0228885 A1 | 8/2017 | Baumgartner | |
| 2017/0261993 A1 | 9/2017 | Venable et al. | |
| 2017/0262724 A1 | 9/2017 | Wu et al. | |
| 2017/0280125 A1 | 9/2017 | Brown et al. | |
| 2017/0286773 A1 | 10/2017 | Skaff et al. | |
| 2017/0286901 A1 | 10/2017 | Skaff et al. | |
| 2017/0323376 A1 | 11/2017 | Glaser et al. | |
| 2017/0325082 A1* | 11/2017 | Rowe | G06Q 30/02 |
| 2018/0001481 A1 | 1/2018 | Shah et al. | |
| 2018/0005035 A1 | 1/2018 | Bogolea et al. | |
| 2018/0005176 A1 | 1/2018 | Williams et al. | |
| 2018/0020145 A1 | 1/2018 | Kotfis et al. | |
| 2018/0051991 A1 | 2/2018 | Hong | |
| 2018/0053091 A1 | 2/2018 | Savvides et al. | |
| 2018/0053305 A1 | 2/2018 | Gu et al. | |
| 2018/0101813 A1 | 4/2018 | Paat et al. | |
| 2018/0114183 A1 | 4/2018 | Howell | |
| 2018/0143003 A1 | 5/2018 | Clayton et al. | |
| 2018/0174325 A1 | 6/2018 | Fu et al. | |
| 2018/0201423 A1 | 7/2018 | Drzewiecki et al. | |
| 2018/0204111 A1 | 7/2018 | Zadeh et al. | |
| 2018/0281191 A1 | 10/2018 | Sinyavskiy et al. | |
| 2018/0293442 A1 | 10/2018 | Fridental et al. | |
| 2018/0313956 A1 | 11/2018 | Rzeszutek et al. | |
| 2018/0314260 A1 | 11/2018 | Jen et al. | |
| 2018/0314908 A1 | 11/2018 | Lam | |
| 2018/0315007 A1 | 11/2018 | Kingsford et al. | |
| 2018/0315065 A1 | 11/2018 | Zhang et al. | |
| 2018/0315173 A1 | 11/2018 | Phan et al. | |
| 2018/0315865 A1 | 11/2018 | Haist et al. | |
| 2019/0057588 A1 | 2/2019 | Savvides et al. | |
| 2019/0065861 A1 | 2/2019 | Savvides et al. | |
| 2019/0073554 A1 | 3/2019 | Rzeszutek | |
| 2019/0149725 A1* | 5/2019 | Adato | H04N 1/32144 |
| | | | 348/158 |
| 2019/0180150 A1 | 6/2019 | Taylor et al. | |
| 2019/0197728 A1 | 6/2019 | Yamao | |
| 2019/0392212 A1 | 12/2019 | Sawhney et al. | |

FOREIGN PATENT DOCUMENTS

| | | |
|---|---|---|
| CN | 104200086 | 12/2014 |
| CN | 107067382 | 8/2017 |
| EP | 766098 | 4/1997 |
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |
| EP | 2693362 | 2/2014 |
| GB | 2323238 | 9/1998 |
| GB | 2330265 | 4/1999 |
| KR | 101234798 | 1/2009 |
| KR | 1020190031431 | 3/2019 |
| WO | WO 99/23600 | 5/1999 |
| WO | WO 2003002935 | 1/2003 |
| WO | WO 2003025805 | 3/2003 |
| WO | WO 2006136958 | 12/2006 |
| WO | WO 2007042251 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014066422 | 5/2014 |
| WO | WO 2014092552 | 6/2014 |
| WO | WO 2014181323 | 11/2014 |
| WO | WO 2015127503 | 9/2015 |
| WO | WO 2016020038 | 2/2016 |
| WO | WO 2018018007 | 1/2018 |
| WO | WO 2019023249 | 1/2019 |

OTHER PUBLICATIONS

Ni et al., "Edge Detection and Feature Line Tracing in 3D-Point Clouds by Analyzing Geometric Properties of Neighborhoods," Remote Sensing, vol. 8, Issue 9, pp. 1-20 (2016).
Hackel et al., "Contour detection in unstructured 3D point clouds," IEEE, 2016 Conference on Computer Vision and Pattern Recognition (CVPR), Jun. 27-30, 2016, pp. 1-9.
Li et al., "An Improved RANSAC for 3D Point Cloud Plane Segmentation Based on Normal Distribution Transformation Cells," Remote Sensing, vol. 9: 433, pp. 1-16 (2017).
Weber et al., "Methods for Feature Detection in Point Clouds," Visualization of Large and Unstructured Data Sets—IRTG Workshop, pp. 90-99 (2010).
Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=pdf, pp. 1-6.
Hao et al., "Structure-based object detection from scene point clouds," Science Direct, vol. 191, pp. 148-160 (2016).
Hu et al., "An Improved Method of Discrete Point Cloud Filtering based on Complex Environment," International Journal of Applied Mathematics and Statistics, vol. 48, Issue 18 (2013).
Deschaud, et al., "A Fast and Accurate Plane Detection Algorithm for Large Noisy Point Clouds Using Filtered Normals and Voxel Growing," 3DPVT, May 2010, Paris, France, [hal-01097361].

(56) References Cited

OTHER PUBLICATIONS

Mitra et al., "Estimating Surface Normals in Noisy Point Cloud Data," International Journal of Computational Geometry & Applications, Jun. 8-10, 2003, pp. 322-328.
Park et al., "Autonomous Mobile Robot Navigation Using Passive RFID in Indoor Environment," IEEE, Transactions on Industrial Electronics, vol. 56, Issue 7, pp. 2366-2373 (Jul. 2009).
Batalin et al., "Mobile robot navigation using a sensor network," IEEE, International Conference on Robotics and Automation, Apr. 26-May 1, 2004, pp. 636-641.
Marder-Eppstein et al., "The Office Marathon: Robust navigation in an indoor office environment," IEEE, 2010 International Conference on Robotics and Automation, May 3-7, 2010, pp. 300-307.
International Search Report and Written Opinion for International Application No. PCT/US2019/025859 dated Jul. 3, 2019.
International Search Report and Written Opinion for corresponding International Patent Application No. PCT/US2016/064110 dated Mar. 20, 2017.
International Search Report and Written Opinion for corresponding International Patent Application No. PCT/US2017/024847 dated Jul. 7, 2017.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion from International Patent Application No. PCT/US2019/025849 dated Jul. 9, 2019.
International Search Report and Written Opinion for International Patent Application No. PCT/US2013/053212 dated Dec. 1, 2014.
International Search Report and Written Opinion for International Patent Application No. PCT/US2013/070996 dated Apr. 2, 2014.
Jadhav et al. "Survey on Spatial Domain dynamic template matching technique for scanning linear barcode," International Journal of scieve and research v 5 n 3, Mar. 2016)(Year: 2016).
Jian Fan et al: "Shelf detection via vanishing point and radial projection", 2014 IEEE International Conference on image processing (ICIP), IEEE, (Oct. 27, 2014), pp. 1575-1578.
Kang et al., "Kinematic Path-Tracking of Mobile Robot Using Iterative learning Control", Journal of Robotic Systems, 2005, pp. 111-121.
Kay et al. "Ray Tracing Complex Scenes." ACM SIGGRAPH Computer Graphics, vol. 20, No. 4, ACM, pp. 269-278, 1986.
Kelly et al., "Reactive Nonholonomic Trajectory Generation via Parametric Optimal Control", International Journal of Robotics Research, vol. 22, No. 7-8, pp. 583-601 (Jul. 30, 2013).
Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31.
Lecking et al: "Localization in a wide range of industrial environments using relative 3D ceiling features", IEEE, pp. 333-337 (Sep. 15, 2008).
Lee et al. "Statistically Optimized Sampling for Distributed Ray Tracing." ACM SIGGRAPH Computer Graphics, vol. 19, No. 3, ACM, pp. 61-67, 1985.
Likhachev, Maxim, and Dave Ferguson. "Planning Long dynamically feasible maneuvers for autonomous vehicles." The international journal of Robotics Reasearch 28.8 (2009): 933-945. (Year:2009).
McNaughton, Matthew, et al. "Motion planning for autonomous driving with a conformal spatiotemporal lattice." Robotics and Automation (ICRA), 2011 IEEE International Conference on. IEEE, 2011. (Year: 2011).
N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Norriof et al., "Experimental comparison of some classical iterative learning control algorithms", IEEE Transactions on Robotics and Automation, Jun. 2002, pp. 636-641.
Notice of allowance for U.S. Appl. No. 13/568,175 dated Sep. 23, 2014.
Notice of allowance for U.S. Appl. No. 13/693,503 dated Mar. 11, 2016.
Notice of allowance for U.S. Appl. No. 14/068,495 dated Apr. 25, 2016.
Notice of allowance for U.S. Appl. No. 14/518,091 dated Apr. 12, 2017.
Notice of allowance for U.S. Appl. No. 15/211,103 dated Apr. 5, 2017.
Olson, Clark F., etal. "Wide-Baseline Stereo Vision for terrain Mapping" in Machine Vision and Applications, Aug. 2010.
Oriolo et al., "An iterative learning controller for nonholonomic mobile Robots", the international Journal of Robotics Research, Aug. 1997, pp. 954-970.
Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, pp. 176-181.
Perveen et al. (An overview of template matching methodologies and its application, International Journal of Research in Computer and Communication Technology, v2n10, Oct. 2013) (Year: 2013).
Pivtoraiko et al., "Differentially constrained mobile robot motion planning in state lattices", journal of field robotics, vol. 26, No. 3, 2009, pp. 308-333.
Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.
Puwein, J., et al."Robust Multi-view camera calibration for wide-baseline camera networks," in IEEE Workshop on Applications of computer vision (WACV), Jan. 2011.
Rusu, et al. "How to incrementally register pairs of clouds," PCL Library, retrieved from internet on Aug. 22, 2016 [http://pointclouds.org/documentation/tutorials/pairwise_incremental_registration.php.
Rusu, et al. "Spatial Change detection on unorganized point cloud data," PCL Library, retrieved from internet on Aug. 19, 2016 [http://pointclouds.org/documentation/tutorials/octree_change.php].
Schnabel et al. "Efficient RANSAC for Point-Cloud Shape Detection", vol. 0, No. 0, pp. 1-12 (1981).
Senthilkumaran, et al., "Edge Detection Techniques for Image Segmentation—A Survey of Soft Computing Approaches", International Journal of Recent Trends in Engineering, vol. 1, No. 2 (May 2009).
Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].
Tahir, Rabbani, et al., "Segmentation of point clouds using smoothness constraint," International Archives of Photogrammetry, Remote Sensing and Spatial Information Sciences 36.5 (Sep. 2006): 248-253.
Tseng, et al., "A Cloud Removal Approach for Aerial Image Visualization", International Journal of Innovative Computing, Information & Control, vol. 9, No. 6, pp. 2421-2440 (Jun. 2013).
Uchiyama, et al., "Removal of Moving Objects from a Street-View Image by Fusing Multiple Image Sequences", Pattern Recognition, 2010, 20th International Conference on, IEEE, Piscataway, NJ pp. 3456-3459 (Aug. 23, 2010).
United Kingdom Intellectual Property Office, "Combined Search and Examination Report" for GB Patent Application No. 1813580.6 dated Feb. 21, 2019.
United Kingdom Intellectual Property Office, Combined Search and Examination Report dated Jan. 22, 2016 for GB Patent Application No. 1417218.3.
United Kingdom Intellectual Property Office, Combined Search and Examination Report dated Jan. 22, 2016 for GB Patent Application No. 1521272.3.
United Kingdom Intellectual Property Office, Combined Search and Examination Report dated Mar. 11, 2015 for GB Patent Application No. 1417218.3.

(56) References Cited

OTHER PUBLICATIONS

Varol Gul et al: "Product placement detection based on image processing", 2014 22nd Signal Processing and Communication Applications Conference (SIU), IEEE, Apr. 23, 2014.
Varol Gul et al: "Toward Retail product recognition on Grocery shelves", Visual Communications and image processing; Jan. 20, 2004; San Jose, (Mar. 4, 2015).
Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).
Ziang Xie et al., "Multimodal Blending for High-Accuracy Instance Recognition", 2013 IEEE RSJ International Conference on Intelligent Robots and Systems, p. 2214-2221.
"Fair Billing with Automatic Dimensioning" pp. 1-4, undated, Copyright Mettler-Toledo International Inc.
"Plane Detection in Point Cloud Data" dated Jan. 25, 2010 by Michael Ying Yang and Wolfgang Forstner, Technical Report 1, 2010, University of Bonn.
"Swift Dimension" Trademark Omniplanar, Copyright 2014.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Biswas et al. "Depth Camera Based Indoor Mobile Robot Localization and Navigation" Robotics and Automation (ICRA), 2012 IEEE International Conference on IEEE, 2012.
Bohm, Multi-Image Fusion for Occlusion-Free Façade Texturing, International Archives of the Photogrammetry, Remote Sensing and Spatial Information Sciences, pp. 867-872 (Jan. 2004).
Bristow et al., "A Survey of Iterative Learning Control", IEEE Control Systems, Jun. 2006, pp. 96-114.
Buenaposada et al. "Realtime tracking and estimation of plane pose" Proceedings of the ICPR (Aug. 2002) vol. II, IEEE pp. 697-700.
Carreira et al., "Enhanced PCA-based localization using depth maps with missing data," IEEE, pp. 1-8, Apr. 24, 2013.
Chen et al. "Improving Octree-Based Occupancy Maps Using Environment Sparsity with Application to Aerial Robot Navigation" Robotics and Automation (ICRA), 2017 IEEE International Conference on IEEE, pp. 3656-3663, 2017.
Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).
Cook et al., "Distributed Ray Tracing" ACM SIGGRAPH Computer Graphics, vol. 18, No. 3, ACM pp. 137-145, 1984.
Datta, A., et al. "Accurate camera calibration using iterative refinement of control points," in Computer Vision Workshops (ICCV Workshops), 2009.
Douillard, Bertrand, et al. "On the segmentation of 3D LIDAR point clouds." Robotics and Automation (ICRA), 2011 IEEE International Conference on IEEE, 2011.
Dubois, M., et al., A comparison of geometric and energy-based point cloud semantic segmentation methods, European Conference on Mobile Robots (ECMR), p. 88-93, 25-27, Sep. 2013.
Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).
F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.
Federico Tombari et al. "Multimodal cue integration through Hypotheses Verification for RGB-D object recognition and 6DOF pose estimation", IEEE International Conference on Robotics and Automation, Jan. 2013.
Flores, et al., "Removing Pedestrians from Google Street View Images", Computer Vision and Pattern Recognition Workshops, 2010 IEEE Computer Society Conference on, IEE, Piscataway, NJ, pp. 53-58 (Jun. 13, 2010).
Glassner, "Space Subdivision for Fast Ray Tracing." IEEE Computer Graphics and Applications, 4.10, pp. 15-24, 1984.
Golovinskiy, Aleksey, et al. "Min-Cut based segmentation of point clouds." Computer Vision Workshops (ICCV Workshops), 2009 IEEE 12th International Conference on. IEEE, 2009.
International Search Report and Written Opinion from International Patent Application No. PCT/US2019/064020 dated Feb. 19, 2020.
International Search Report and Written Opinion for International Application No. PCT/US2019/025870 dated Jun. 21, 2019.
Kim, et al. "Robust approach to reconstructing transparent objects using a time-of-flight depth camera", Optics Express, vol. 25, No. 3; Published Feb. 6, 2017.

* cited by examiner

METHOD, SYSTEM AND APPARATUS FOR MOBILE AUTOMATION APPARATUS LOCALIZATION

BACKGROUND

Environments in which objects are managed, such as retail facilities, may be complex and fluid. For example, a retail facility may include objects such as products for purchase, a distribution environment may include objects such as parcels or pallets, a manufacturing environment may include objects such as components or assemblies, a healthcare environment may include objects such as medications or medical devices.

A mobile apparatus may be employed to perform tasks within the environment, such as capturing data for use in identifying products that are out of stock, incorrectly located, and the like. To travel within the environment a path is generated extending from a starting location to a destination location, and the apparatus travels the path to the destination. To accurately travel along the above-mentioned path, the apparatus typically tracks its location within the environment. However, such location tracking (also referred to as localization) is subject to various sources of noise and error, which can accumulate to a sufficient degree to affect navigational accuracy and impede the performance of tasks by the apparatus, such as data capture tasks.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
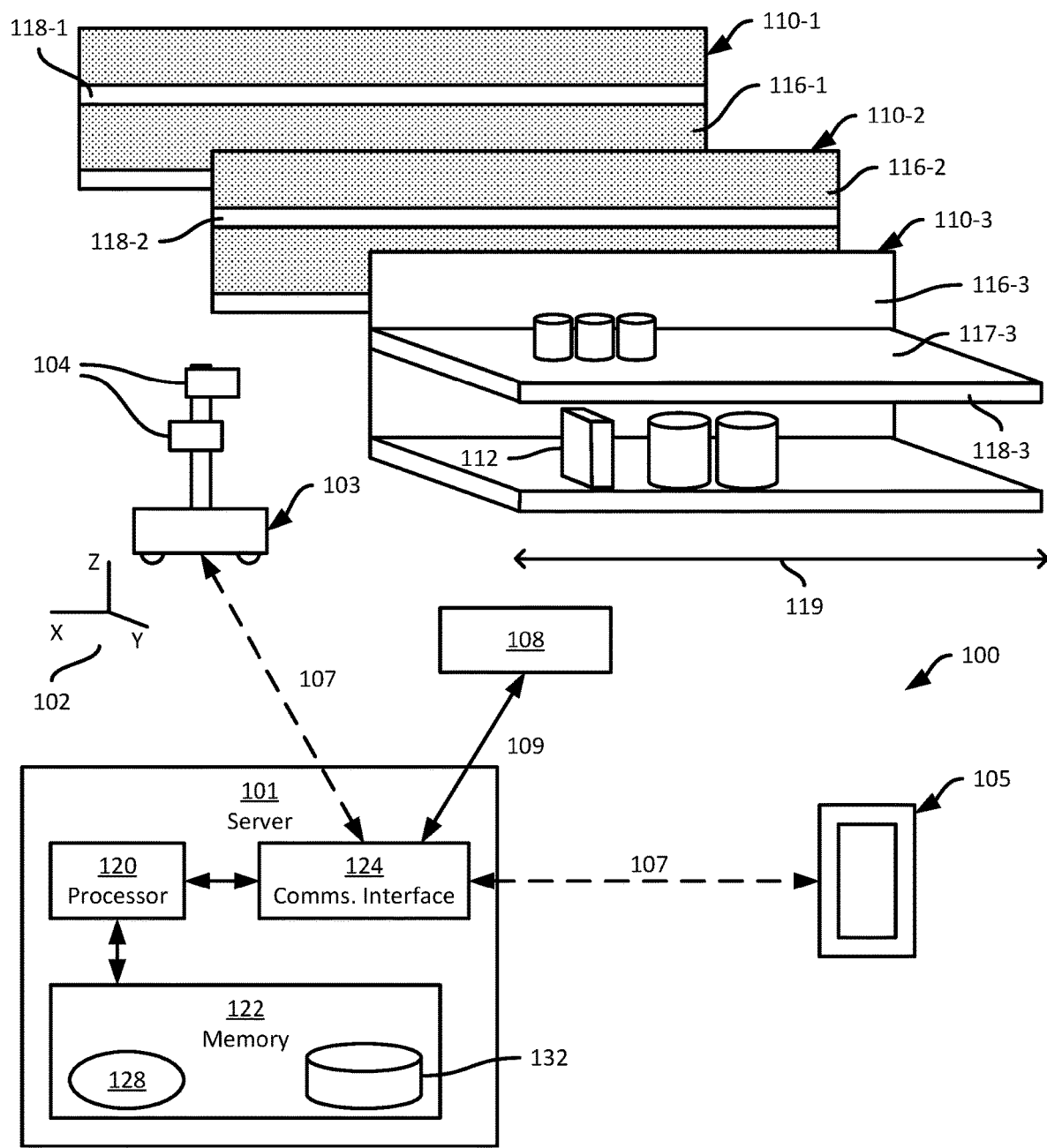
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of mobile automation apparatus localization in a navigation controller, the method comprising: controlling a depth sensor to capture a plurality of depth measurements corresponding to an area containing a navigational structure; selecting a primary subset of the depth measurements; selecting, from the primary subset, a corner candidate subset of the depth measurements; generating, from the corner candidate subset, a corner edge corresponding to the navigational structure; selecting an aisle subset of the depth measurements from the primary subset, according to the corner edge; selecting, from the aisle subset, a local minimum depth measurement for each of a plurality of sampling planes extending from the depth sensor; generating a shelf plane from the local minimum depth measurements; and updating a localization of the mobile automation apparatus based on the corner edge and the shelf plane.

Additional examples disclosed herein are directed to a computing device for mobile automation apparatus localization, comprising: a depth sensor; a navigational controller configured to: control the depth sensor to capture a plurality of depth measurements corresponding to an area containing a navigational structure; select a primary subset of the depth measurements; select, from the primary subset, a corner candidate subset of the depth measurements; generate, from the corner candidate subset, a corner edge corresponding to the navigational structure; select an aisle subset of the depth measurements from the primary subset, according to the corner edge; select, from the aisle subset, a local minimum depth measurement for each of a plurality of sampling planes extending from the depth sensor; generate a shelf plane from the local minimum depth measurements; and update a localization of the mobile automation apparatus based on the corner edge and the shelf plane.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 105 via communication links 107, illustrated in the present example as including wireless links. In the present example, the links 107 are provided by a wireless local area network (WLAN) deployed within the retail environment by one or more access points (not shown). In other examples, the server 101, the client device 105, or both, are located outside the retail environment, and the links 107 therefore include wide-area networks such as the Internet, mobile networks, and the like. The system 100 also includes a dock 108 for the apparatus 103 in the present example. The dock 108 is in communication with the server 101 via a link 109 that in the present example is a wired link. In other examples, however, the link 109 is a wireless link.

The client computing device 105 is illustrated in FIG. 1 as a mobile computing device, such as a tablet, smart phone or the like. In other examples, the client device 105 is implemented as another type of computing device, such as a desktop computer, a laptop computer, another server, a kiosk, a monitor, and the like. The system 100 can include a plurality of client devices 105 in communication with the server 101 via respective links 107.

The system 100 is deployed, in the illustrated example, in a retail environment including a plurality of shelf modules 110-1, 110-2, 110-3 and so on (collectively referred to as shelves 110, and generically referred to as a shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3.

The shelf modules 110 are typically arranged in a plurality of aisles, each of which includes a plurality of modules 110 aligned end-to-end. In such arrangements, the shelf edges 118 face into the aisles, through which customers in the retail environment as well as the apparatus 103 may travel. At each end of an aisle, one of the modules 110 forms an aisle endcap, with certain ones of the shelf edges 118 of that module 110 facing not into the aisle, but outwards from the end of the aisle. In some examples (not shown), endcap structures are placed at the ends of aisles. The endcap structures may be additional shelf modules 110, for example having reduced lengths relative to the modules 110 within the aisles, and disposed perpendicularly to the modules 110 within the aisles.

As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to each of the support surface 117-3 and the underside (not shown) of the support surface 117-3. In other examples, the angles between the shelf edge 118-3 and the adjacent surfaces, such as the support surface 117-3, is more or less than ninety degrees. As those of skill in the art will realize, a support surface is not limited to a shelf support surface. In one embodiment, for example, a support surface may be a table support surface (e.g., a table top). In such an embodiment, a "shelf edge" and a "shelf plane" will correspond, respectively, to an edge of a support surface, such as a table support surface, and a plane containing the edge of the table support surface.

The apparatus 103 is deployed within the retail environment, and communicates with the server 101 (e.g. via the link 107) to navigate, autonomously or partially autonomously, along a length 119 of at least a portion of the shelves 110. The apparatus 103 is configured to navigate among the shelves 110, for example according to a frame of reference 102 established within the retail environment. The frame of reference 102 can also be referred to as a global frame of reference. The apparatus 103 is configured, during such navigation, to track the location of the apparatus 103 relative to the frame of reference 102. In other words, the apparatus 103 is configured to perform localization. As will be described below in greater detail, the apparatus 103 is also configured to update the above-mentioned localization by detecting certain structural features within the retail environment.

The apparatus 103 is equipped with a plurality of navigation and data capture sensors 104, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 can be configured to employ the sensors 104 to both navigate among the shelves 110 and to capture shelf data during such navigation.

The server 101 includes a special purpose controller, such as a processor 120, specifically designed to control and/or assist the mobile automation apparatus 103 to navigate the environment and to capture data. To that end, the server 101 is configured to maintain, in a memory 122 connected with the processor 120, a repository 132 containing data for use in navigation by the apparatus 103.

The processor 120 can be further configured to obtain the captured data via a communications interface 124 for subsequent processing (e.g. to detect objects such as shelved products in the captured data, and detect status information corresponding to the objects). The server 101 may also be configured to transmit status notifications (e.g. notifications indicating that products are out-of-stock, low stock or misplaced) to the client device 105 responsive to the determination of product status data. The client device 105 includes one or more controllers (e.g. central processing units (CPUs) and/or field-programmable gate arrays (FPGAs) and the like) configured to process (e.g. to display) notifications received from the server 101.

The processor 120 is interconnected with a non-transitory computer readable storage medium, such as the above-mentioned memory 122, having stored thereon computer readable instructions for performing various functionality, including control of the apparatus 103 to navigate the modules 110 and capture shelf data, as well as post-processing of the shelf data. The memory 122 includes a combination of volatile (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The server 101 also includes the above-mentioned communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 105 and the dock 108—via the links 107 and 109. The links 107 and 109 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail environment via the deployment of one or more wireless access points. The links 107 therefore include either or both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the processor 120. The execution of the above-mentioned instructions by the processor 120 configures the server 101 to perform various actions discussed herein. The applications stored in the memory 122 include a control application 128, which may also be implemented as a suite of logically distinct applications. In general, via execution of the application 128 or subcomponents thereof and in conjunction with the other components of the server 101, the processor 120 is configured to implement various functionality. The processor 120, as configured via the execution of the control application 128, is also referred to herein as the controller 120. As will now be apparent, some or all of the functionality implemented by the controller 120 described below may also be performed by preconfigured hardware elements (e.g. one or more FPGAs and/or Application-Specific Integrated Circuits (ASICs)) rather than by execution of the control application 128 by the processor 120.

Figure 2A:
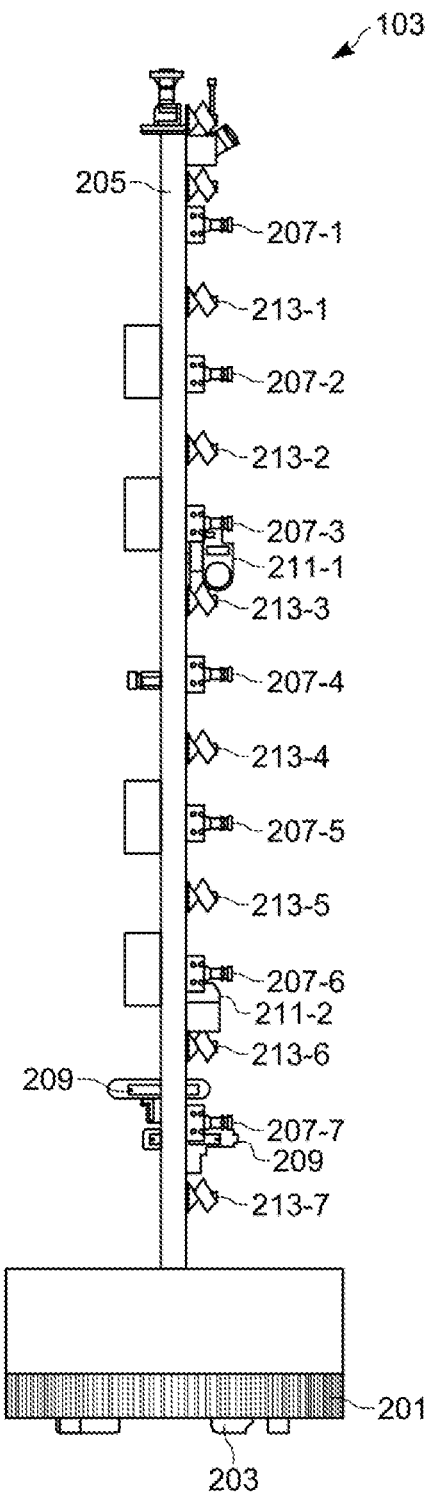
FIG. 2A depicts a mobile automation apparatus in the system of FIG. 1.
Figure 2B:
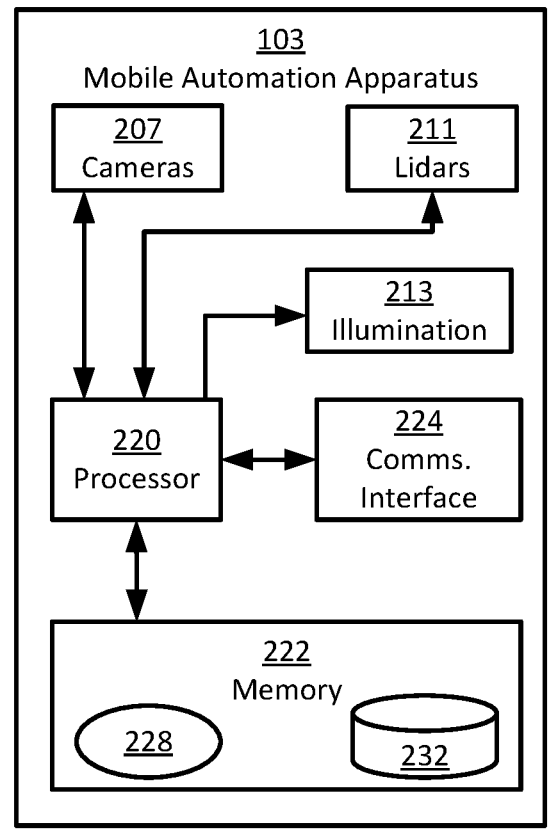
FIG. 2B is a block diagram of certain internal hardware components of the mobile automation apparatus in the system of FIG. 1.

Turning now to FIGS. 2A and 2B, the mobile automation apparatus 103 is shown in greater detail. The apparatus 103 includes a chassis 201 containing a locomotive mechanism 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 104 mentioned earlier. In particular, the sensors 104 include at least one imaging sensor 207, such as a digital camera, as well as at least one depth sensor 209, such as a 3D digital camera capable of capturing both depth data and image data. The apparatus 103 also includes additional depth sensors, such as LIDAR sensors 211. In other examples, the apparatus 103 includes additional sensors, such as one or more RFID readers, temperature sensors, and the like.

In the present example, the mast 205 supports seven digital cameras 207-1 through 207-7, and two LIDAR sensors 211-1 and 211-2. The mast 205 also supports a plurality of illumination assemblies 213, configured to illuminate the fields of view of the respective cameras 207. That is, the illumination assembly 213-1 illuminates the field of view of the camera 207-1, and so on. The sensors 207 and 211 are oriented on the mast 205 such that the fields of view of each sensor face a shelf 110 along the length 119 of which the apparatus 103 is travelling. The apparatus 103 is configured to track a location of the apparatus 103 (e.g. a location of the center of the chassis 201) in a common frame of reference previously established in the retail facility, permitting data captured by the mobile automation apparatus to be registered to the common frame of reference.

The mobile automation apparatus 103 includes a special-purpose controller, such as a processor 220, as shown in FIG. 2B, interconnected with a non-transitory computer readable storage medium, such as a memory 222. The memory 222 includes a combination of volatile (e.g. Random Access Memory or RAM) and non-volatile memory (e.g. read only memory or ROM, Electrically Erasable Programmable Read Only Memory or EEPROM, flash memory). The processor 220 and the memory 222 each comprise one or more integrated circuits. The memory 222 stores computer readable instructions for execution by the processor 220. In particular, the memory 222 stores a control application 228 which, when executed by the processor 220, configures the processor 220 to perform various functions discussed below in greater detail and related to the navigation of the apparatus 103 (e.g. by controlling the locomotive mechanism 203). The application 228 may also be implemented as a suite of distinct applications in other examples.

The processor 220, when so configured by the execution of the application 228, may also be referred to as a controller 220. Those skilled in the art will appreciate that the functionality implemented by the processor 220 via the execution of the application 228 may also be implemented by one or more specially designed hardware and firmware components, such as FPGAs, ASICs and the like in other embodiments.

The memory 222 may also store a repository 232 containing, for example, a map of the environment in which the apparatus 103 operates, for use during the execution of the application 228. The apparatus 103 may communicate with the server 101, for example to receive instructions to navigate to specified locations (e.g. to the end of a given aisle consisting of a set of modules 110) and initiate data capture operations (e.g. to traverse the above-mentioned aisle while capturing image and/or depth data), via a communications interface 224 over the link 107 shown in FIG. 1. The communications interface 224 also enables the apparatus 103 to communicate with the server 101 via the dock 108 and the link 109.

In the present example, as discussed below, the apparatus 103 is configured (via the execution of the application 228 by the processor 220) to maintain a localization representing a location of the apparatus 103 within a frame of reference, such as (but not necessarily limited to) the global frame of reference 102. Maintaining an updated localization enables the apparatus 103 to generate commands for operating the locomotive mechanism 203 to travel to other locations, such as an aisle specified in an instruction received from the server 101. As will be apparent to those skilled in the art, localization based on inertial sensing (e.g. via accelerometers and gyroscopes), as well as localization based on odometry (e.g. via a wheel encoder coupled to the locomotive mechanism 203) may suffer errors that accumulate over time. The apparatus 103 is therefore configured, as discussed below in greater detail, to update localization data by detecting certain navigational structures within the retail environment. In particular, aisle endcaps and shelf planes are employed by the apparatus 103 to update localization data.

As will be apparent in the discussion below, in other examples, some or all of the processing performed by the server 101 may be performed by the apparatus 103, and some or all of the processing performed by the apparatus 103 may be performed by the server 101.

Figure 3:
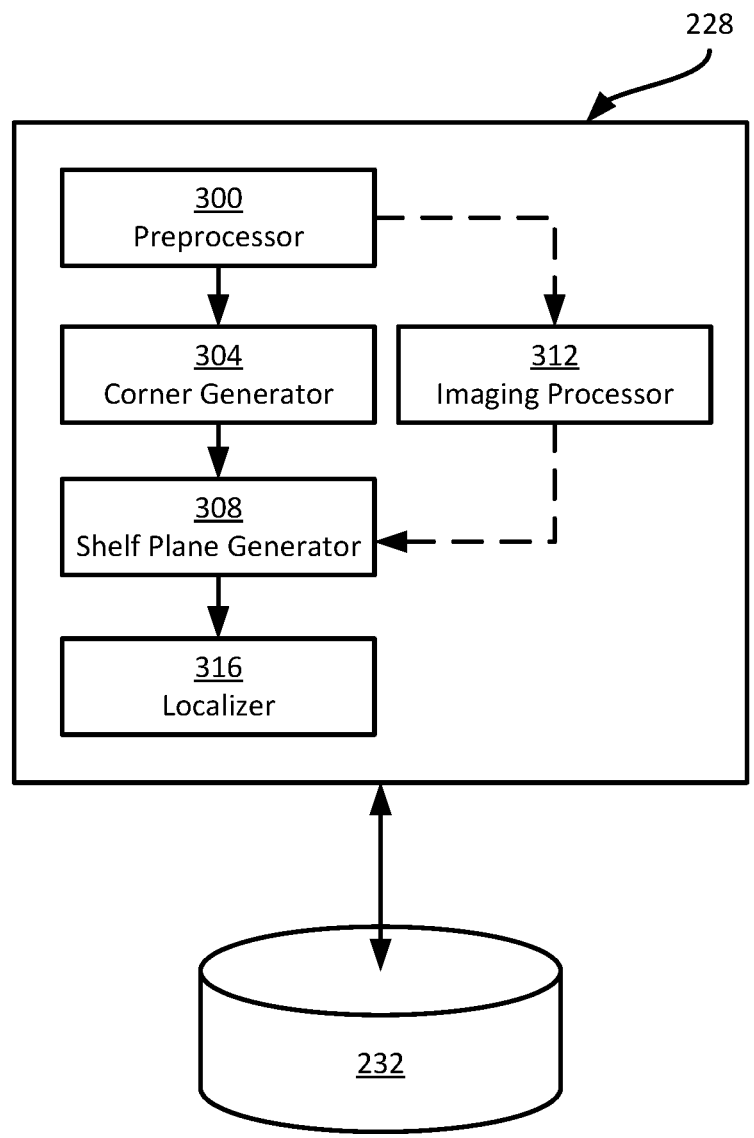
FIG. 3 is a block diagram of certain internal components of the mobile automation apparatus of FIG. 1.

Turning now to FIG. 3, before describing the actions taken by the apparatus 103 to update localization data, certain components of the application 228 will be described in greater detail. As will be apparent to those skilled in the art, in other examples the components of the application 228 may be separated into distinct applications, or combined into other sets of components. Some or all of the components illustrated in FIG. 3 may also be implemented as dedicated hardware components, such as one or more ASICs or FPGAs.

The application 228 includes a preprocessor 300 configured to select a primary subset of depth measurements for further processing to localize the apparatus 103. The application 228 also includes a corner generator 304 configured to detect certain navigational structures upon which to base localization updates. In the present example, the generator 304 is referred to as a corner generator because the navigational structure detected by the corner generator 304 is a corner (e.g. a vertical edge) of a shelf module 110, which may also be referred to as an endcap corner. The application 228 further includes a shelf plane generator 308, configured to generate, based on the captured depth data or a subset thereof, a plane containing the shelf edges 118 within an aisle containing a plurality of modules 110. In some examples, the application 228 also includes an imaging processor 312, configured to detect structural features such as the shelf edges 118 from captured image data (i.e. independent of the captured depth data). The image-based shelf edge detections are employed by the shelf plane generator 308 to validate the generated shelf plane. In other examples, the imaging processor 312 is omitted.

The application 228 also includes a localizer 316, configured to receive one or both of the generated corner edge from the corner generator 304 and a shelf plane from the shelf plane generator 308, and to update the localization of the apparatus 103 in at least one frame of reference based on the above-mentioned information. As will be seen below, the frame of reference can include the global frame of reference 102 mentioned above, as well as a local frame of reference specific to a given aisle of modules 110. The localizer 316 can also include subcomponents configured to generate and execute paths along with the apparatus 103 travels (via control of the locomotive mechanism 203), while maintaining updated localization information.

Figure 4:
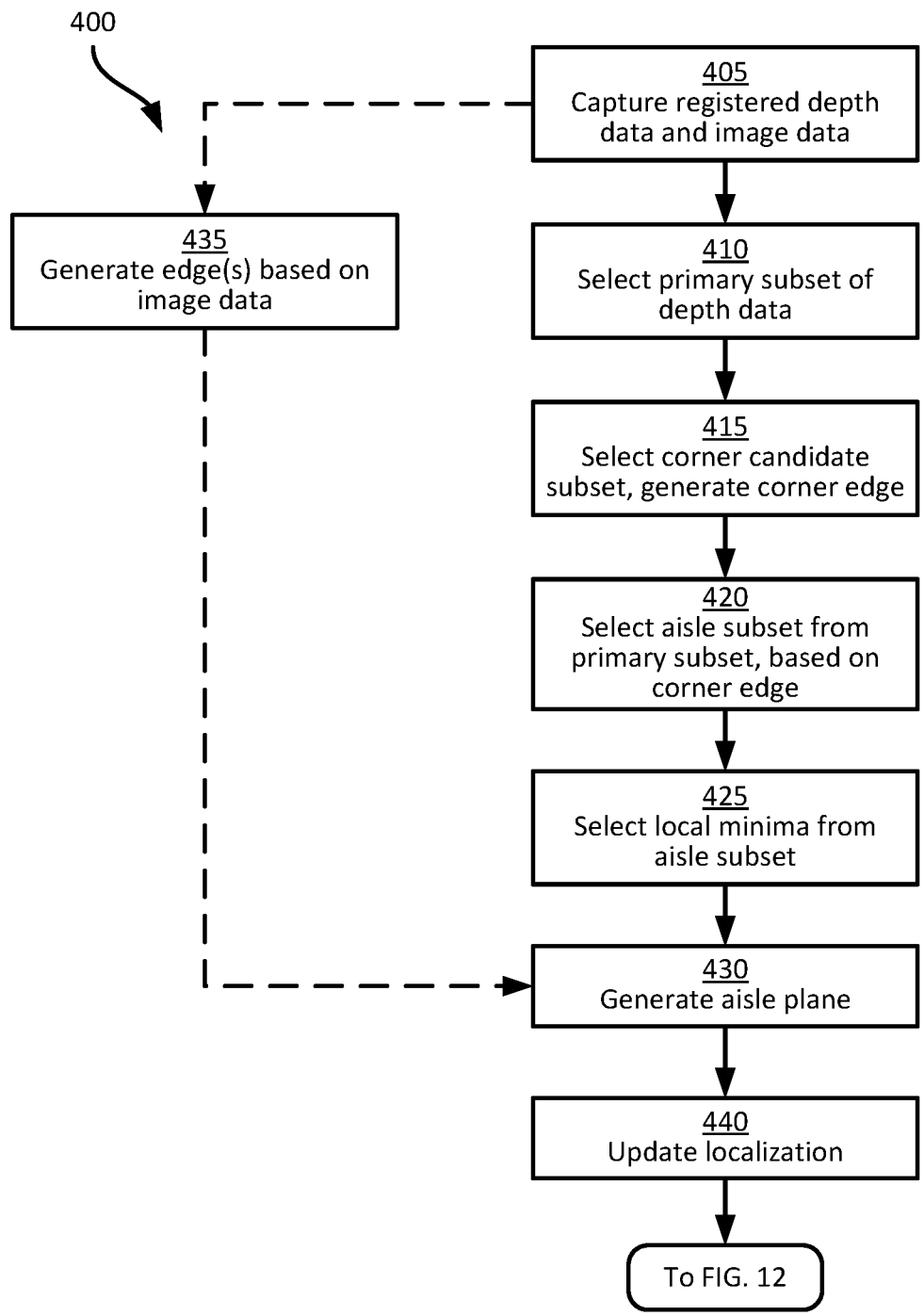
FIG. 4 is a flowchart of a method of localization for the mobile automation apparatus of FIG. 1.

The functionality of the application 228 will now be described in greater detail, with reference to FIG. 4. FIG. 4 illustrates a method 400 of updating mobile automation apparatus localization, which will be described in conjunction with its performance in the system 100, and in particular by the apparatus 103, with reference to the components illustrated in FIG. 3.

At block 405, the apparatus 103, and in particular the preprocessor 300 of the application 228, is configured to capture a plurality of depth measurements, also referred to as depth data. The depth measurements are captured via the control of one or more depth sensors of the apparatus 103. In the present example, the depth measurements are captured via control of the depth sensor 209 (i.e. the 3D digital camera) mentioned above. The 3D camera is configured to capture both depth measurements and color data, also referred to herein as image data. That is, as will be apparent to those skilled in the art, each frame captured by the 3D camera is a point cloud including both color and depth data for each point. The point cloud is typically defined in a frame of reference centered on the sensor 209 itself. In other examples, the image data is omitted, and the performance of block 405 includes only the capture of depth data.

Figure 5:
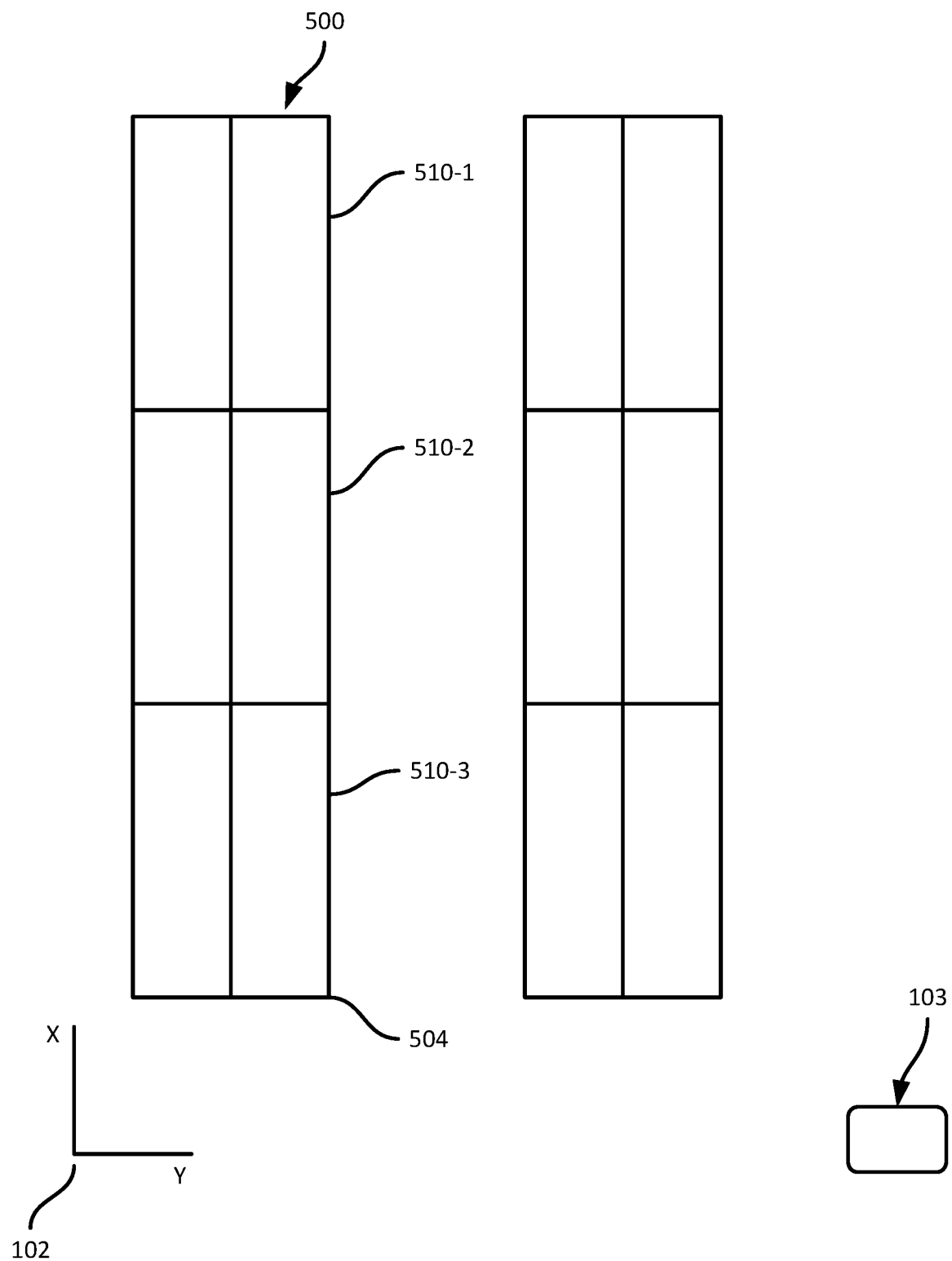
FIG. 5 is an overhead view of an aisle to which the mobile automation apparatus of FIG. 1 is to travel.

The apparatus 103 is configured to perform block 405 responsive to arrival of the apparatus 103 at a specified location in the retail environment. In the present example, prior to performing block 405, the apparatus 103 is configured to receive an instruction from the server 101 to travel from a current location of the apparatus 103 to a particular aisle. For example, referring to FIG. 5, the server 101 can be configured to issue an instruction (e.g. via the link 107) to the apparatus 103 to travel from a current location in the frame of reference 102 to an aisle 500 and, upon arrival at the aisle 500, to begin a data capture operation in which the apparatus 103 traverses the length of a plurality of modules 510-1, 510-2, and 510-3 to capture image and/or depth data depicting the modules 510.

Figure 6:
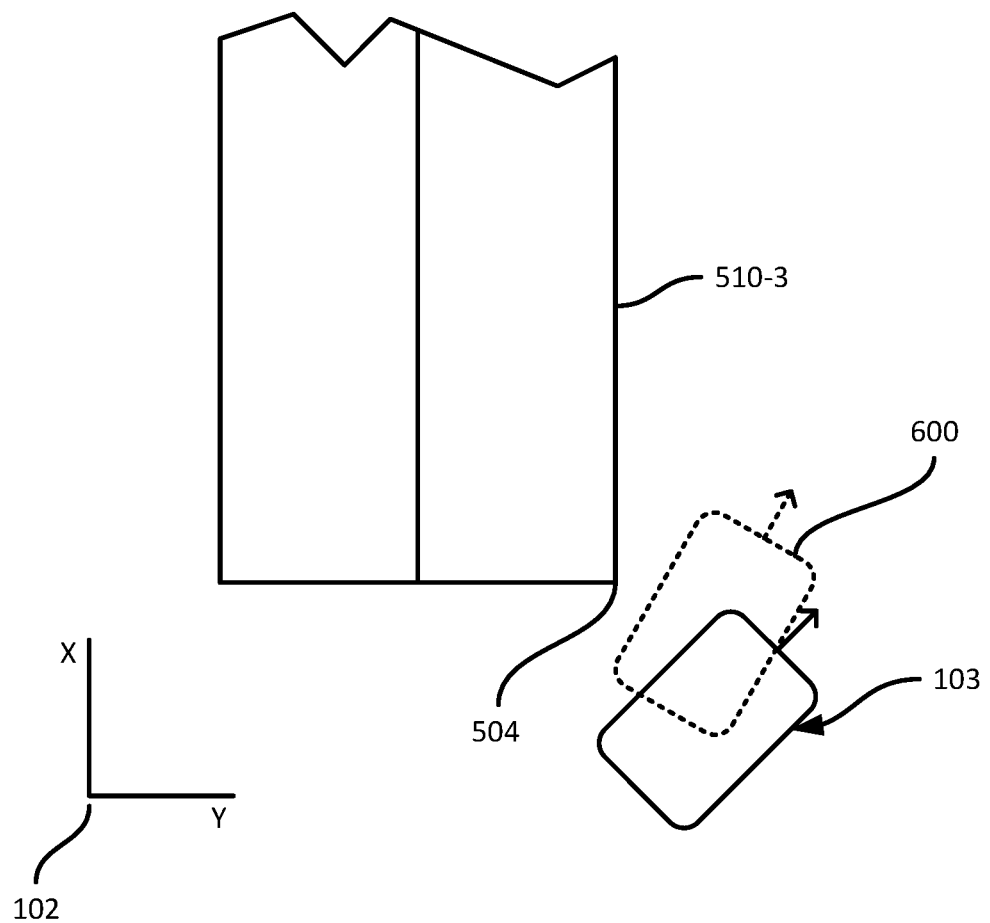
FIG. 6 is a partial overhead view of the aisle of FIG. 5, illustrating localization error accumulated when the mobile automation apparatus of FIG. 1 has reached the aisle.

Responsive to receiving the instruction, the apparatus 103 is configured (e.g. via execution of the localizer 316) to generate and execute a path from the current location of the apparatus 103 to a location 504 of an endcap corner of the aisle 500. The locations of the modules 510, and thus the location 504, are contained in the map stored in the repository 232. The localizer 316 is therefore configured to retrieve the corner location 504 from the repository 232, to generate and execute a path to the location 504. Turning to FIG. 6, the apparatus 103 is shown following execution of the above-mentioned path. In particular, the actual location and orientation (i.e. the actual pose) of the apparatus 103 are shown in solid lines, while a localization 600 of the apparatus 103 (i.e. a location and orientation in the frame of reference 102 as maintained by the localizer 316) is shown in dashed lines. As seen in FIG. 6, the localization of the apparatus 103 perceived by the localizer 316 is inaccurate. Errors in localization can arise from a variety of sources and may accumulate over time. Error sources include slippage of the locomotive mechanism 203 on the floor of the retail facility, signal noise from inertial sensors, and the like.

Accumulated localization errors can reach, in some examples, about 20 centimeters (as will be apparent, both larger and smaller errors are also possible). That is, the localization 600 of the apparatus 103 in the frame of reference 102 may be at a distance of about 20 cm from the actual, true position of the apparatus 103. For certain tasks, such as the above-mentioned data capture operation, smaller localization errors (e.g. below about 5 cm) may be required. In other words, for data capture operations to produce captured data (e.g. image data depicting the modules 510) of sufficient quality for subsequent processing, the localizer 316 may be required to maintain a localization that is sufficiently accurate to ensure that the true position of the apparatus 103 relative to the module 510 for which data is being captured is within about 5 cm of a target position. The target position may be, for example, about 75 cm from the module 510, and thus the localizer 316 may be required to maintain a localization that ensures that the true distance between the module 510 and the apparatus 103 remains between about 70 cm and about 80 cm.

Therefore, prior to beginning the data capture operation, the apparatus 103 is configured to update the localization stored in the localizer 316 via the performance of the method 400, beginning with the capture of depth and image data at block 405. The performance of block 405 is initiated following the arrival of the apparatus 103 adjacent the location 504, as shown in FIG. 6.

Figure 7:
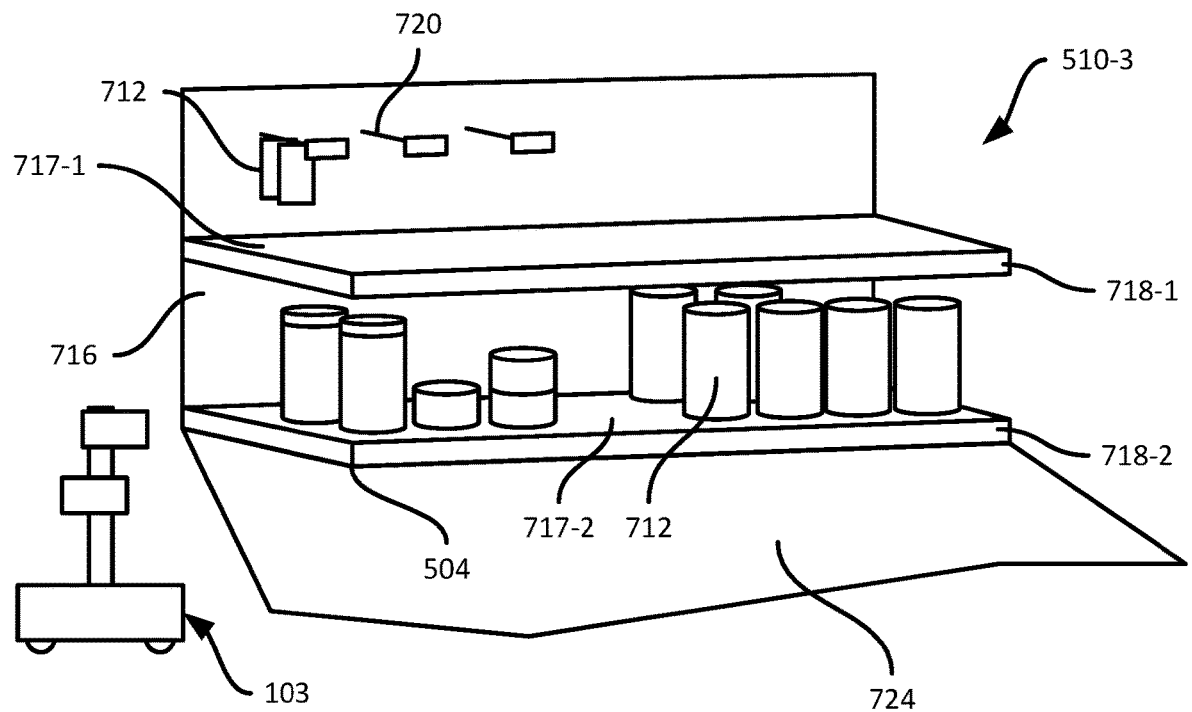
FIG. 7 is a perspective view of a portion of the aisle shown in FIG. 6.

FIG. 7 illustrates a portion of the module 510-3 adjacent to the location 504, following arrival of the apparatus 103 at the location shown in the overhead view of FIG. 6. The module 510-3 includes a pair of support surfaces 717-1 and 717-2 extending from a shelf back 716 to respective shelf edges 718-1 and 718-2. The support surface 717-2 supports products 712 thereon, while the support surface 717-1 does not directly support products 712 itself. Instead, the shelf back 716 supports pegs 720 on which additional products 712 are supported. A portion of a ground surface 724, along which the apparatus 103 travels and corresponding to the X-Y plane (i.e. having a height of zero on the Z axis of the frame of reference 102) in the frame of reference 102, is also illustrated.

Figure 8A:
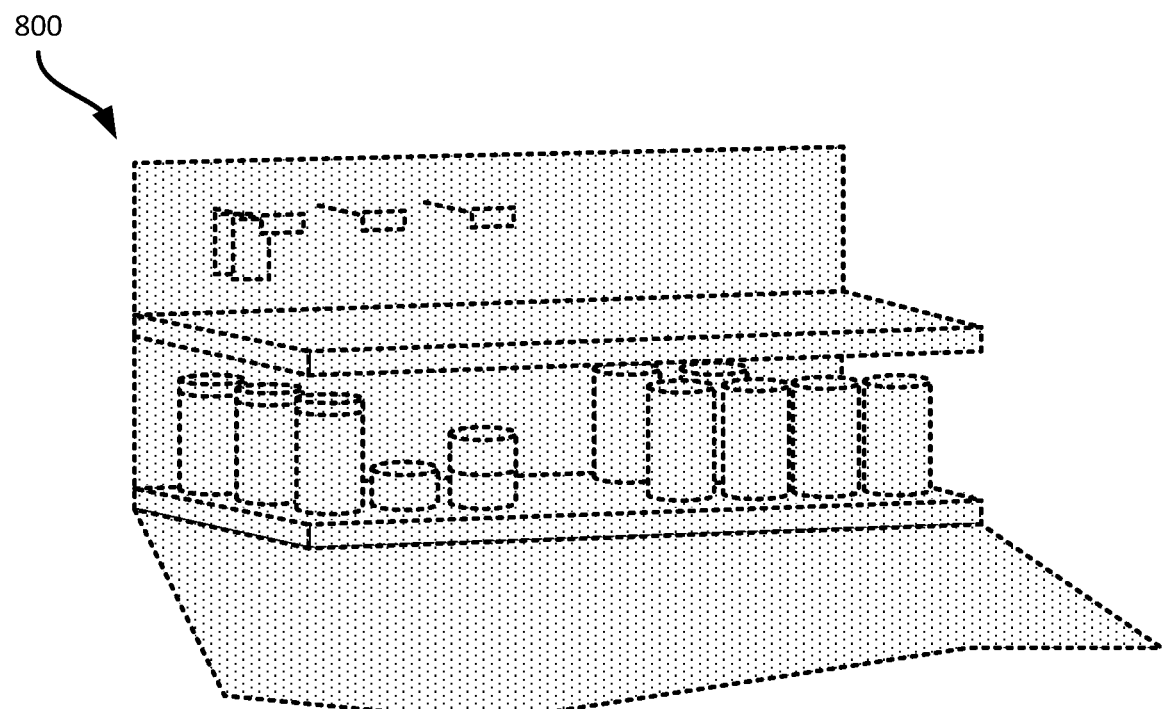
FIGS. 8A and 8B depict depth and image data captured by the mobile automation apparatus of FIG. 1 during the performance of the method of FIG. 4.
Figure 8B:
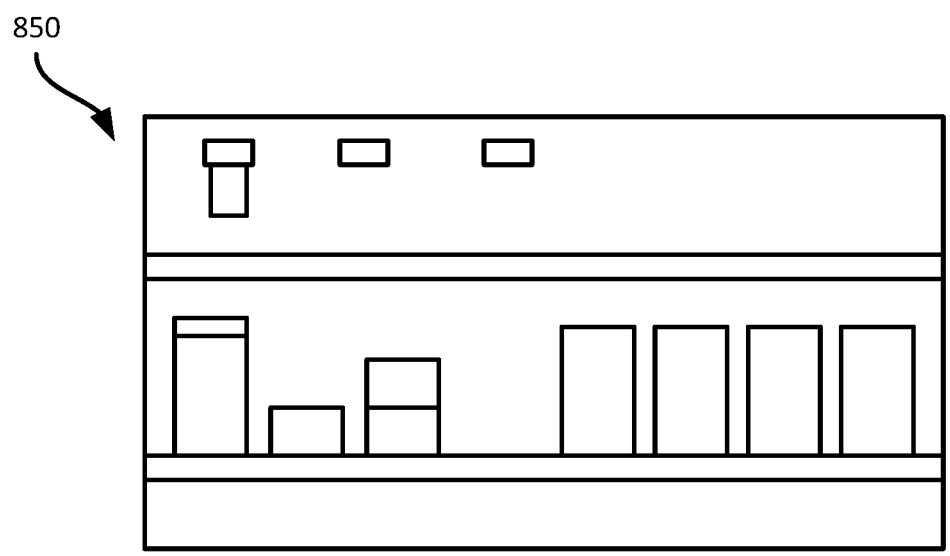

FIGS. 8A and 8B illustrate an example of the data captured at block 405. In particular, FIG. 8A illustrates a set of depth measurements corresponding to the module 510-3, in the form of a point cloud 800, while FIG. 8B illustrates image data 850. In the present example, the sensor 209 is configured to capture depth and image data substantially simultaneously, and the depth and image data are stored in a single file (e.g. each point in the point cloud 800 also includes color data corresponding to the image data 850).

The depth data 800 and the image data 850 are therefore shown separately for illustrative purposes in FIGS. 8A and 8B.

Returning to FIG. 4, at block 410 the preprocessor 300 is configured to select a primary subset of the depth data captured at block 405. The primary subset of depth measurements is selected to reduce the volume of depth measurements to be processed through the remainder of the method 400, while containing structural features upon which the apparatus 103 is configured to base localization updates. In the present example, the primary subset is selected at block 410 by selecting depth measurements within a predefined threshold distance of the sensor 209 (i.e. excluding depth measurements at a greater distance from the sensor than the threshold).

Figure 9A:
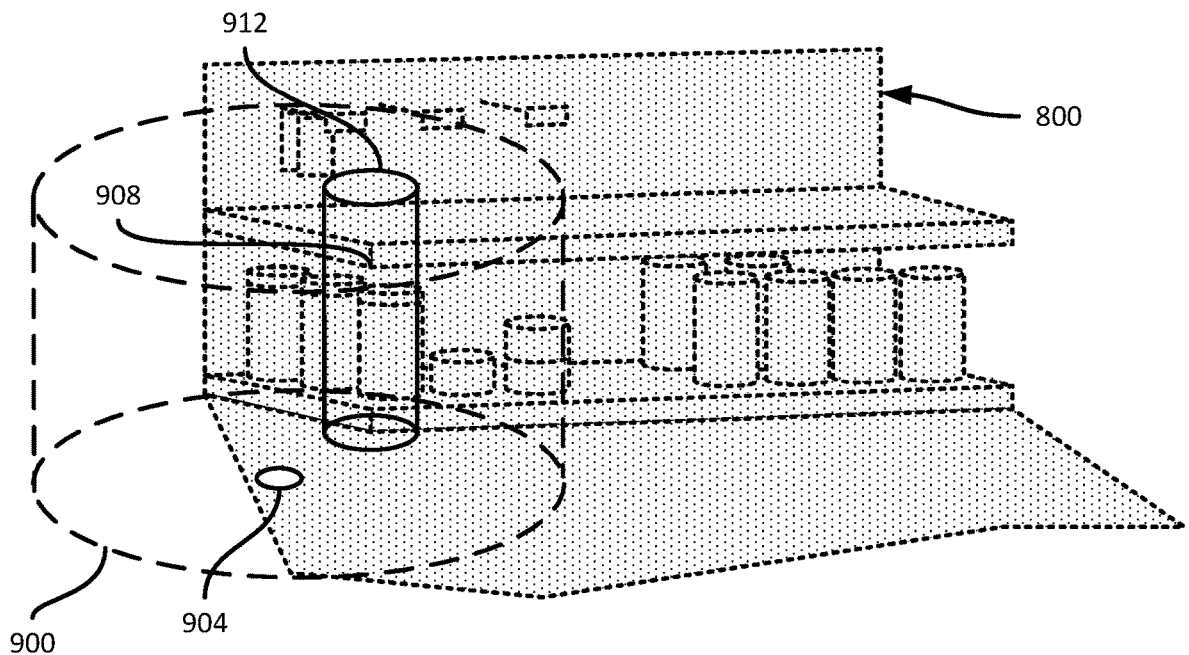
FIGS. 9A-9D illustrate an example performance of blocks 410, 415 and 420 of the method of FIG. 4.

More specifically, in the present example the preprocessor 300 is configured to select the primary subset by selecting any depth measurements from the point cloud 800 that fall within a primary selection region, such as a cylindrical region of predefined dimensions and position relative to the sensor 209. Turning to FIG. 9A, an example cylindrical selection region 900 is illustrated, centered on the location 904 of the sensor 209, which is typically the origin of the frame of reference in which the point cloud 800 is captured. The region 900 has a predefined diameter that is sufficiently large to contain the corner of the endcap module 510-3 despite the potentially inaccurate localization 600 of the apparatus 103 shown in FIG. 6. The region 900 also has a base located at a predefined height relative to the sensor 209 (e.g. to place the base of the region 900 about 2 cm above the ground surface 724). The region 900 also has a predefined height (i.e. a distance from the base to the top of the cylinder) selected to encompass substantially the entire height of the modules 510 (e.g. about 2 meters). In some examples, at block 410 the preprocessor 300 is also configured to select a ground plane subset of depth measurements, for example by applying a pass filter to select only the points within a predefined distance of the X-Y plane in the frame of reference 102 (e.g. above a height of −2 cm and below a height of 2 cm). The ground plane subset can be employed to generate (e.g. by application of a suitable plane fitting operation) a ground plane for use in validating subsequent processing outputs of the method 400, as will be discussed below.

Figure 9B:
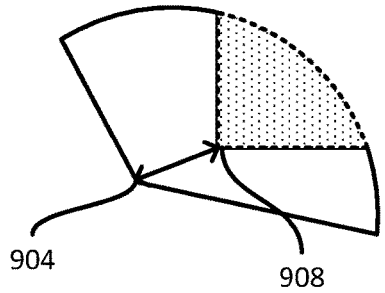

Returning to FIG. 4, at block 415, the corner generator 304 is configured to select, from the primary subset of depth data, a corner candidate subset of depth measurements and to generate a corner edge from the corner candidate subset. The performance of block 415 serves to further restrict the set of depth measurements within which the endcap corner of the module 510-3 is present. Referring to FIG. 9B, the corner generator 304 is configured to select the corner candidate subset, in the present example, by identifying the depth measurement within the primary subset that is closest to the sensor location 904. In particular, FIG. 9B depicts an overhead view of the primary subset of depth measurements. The primary subset is depicted as a wedge rather than as an entire cylinder because the sensor 209 has a field of view of less than 360 degrees (e.g. of about 130 degrees in the illustrated example). As seen in FIG. 9B, only a subset of the depth measurements (the primary subset referred to above) in the point cloud 800 are shown. In particular, no depth measurements corresponding to the ground surface 724 are present in the primary subset.

The corner generator 304 is configured to identify the point 908 in the primary subset as the point closest to the location 904 (i.e. the location of the sensor 209). The point 908 is assumed to correspond to a portion of the endcap corner of the module 510-3. The corner generator 304 is therefore configured, responsive to identifying the point 908, to select the above-mentioned corner candidate subset by generating a corner candidate selection region based on the point 908. In the present example, the corner candidate selection region is a further cylinder, having a smaller predefined diameter than the cylinder 900 mentioned earlier, and having a longitudinal axis that contains the point 908. An example corner candidate selection region 912 is shown in FIG. 9A. The region 912 can be positioned at the same height (e.g. 2 cm above the ground surface 724) as the region 900, and can have the same height as the region 900.

Figure 9C:
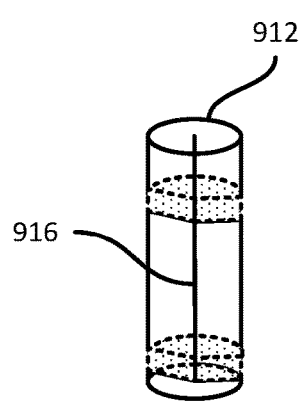

Having selected the corner candidate selection region 912, the corner generator 304 is configured to fit an edge (i.e. a line) to the points contained in the region 912. Referring to FIG. 9C, the region 912 and the corner candidate subset of depth measurements contained therein are shown in isolation. A corner edge 916 is also shown in FIG. 9C, having been fitted to the points of the corner candidate subset. The corner edge 916 is generated according to a suitable line-fitting operation, such as a random sample consensus (RANSAC) line-fitting operation. Constraints may also be applied to the line-fitting operation. For example, the corner generator 304 can be configured to fit a substantially vertical line to the points of the corner candidate subset by imposing a constraint that the resulting corner edge 916 be substantially perpendicular to the above-mentioned ground plane.

Returning to FIG. 4, at block 420, responsive to generating the corner edge 916, the corner generator 304 is configured to select an aisle subset of depth measurements from the primary subset (shown in FIG. 9B), based on the corner edge 916. In particular, referring to FIG. 9D, an aisle subset 924 is selected from the primary subset, excluding a remainder 928 of the primary subset, by selecting only the depth measurements of the primary subset that lie on a predefined side of the corner edge 916 relative to the center location 904. For example, the corner generator 304 is configured to divide the primary subset with a plane 920 extending through the corner edge 916 and intersecting the center 904. The aisle subset 924 is the subset of points on the side of the plane 920 that corresponds to the interior of the aisle 500.

Figure 9D:
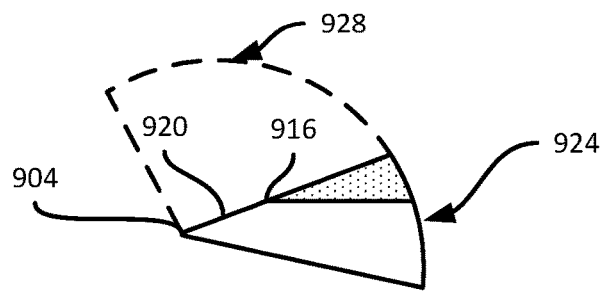

In other examples, at block 420 the corner generator 304 is also configured to select an endcap subset, corresponding to the remainder 928 of the primary subset as shown in FIG. 9D. As will now be apparent, the endcap subset is assumed to contain the edges 718 that extend perpendicularly to the aisle 500.

Figure 10A:
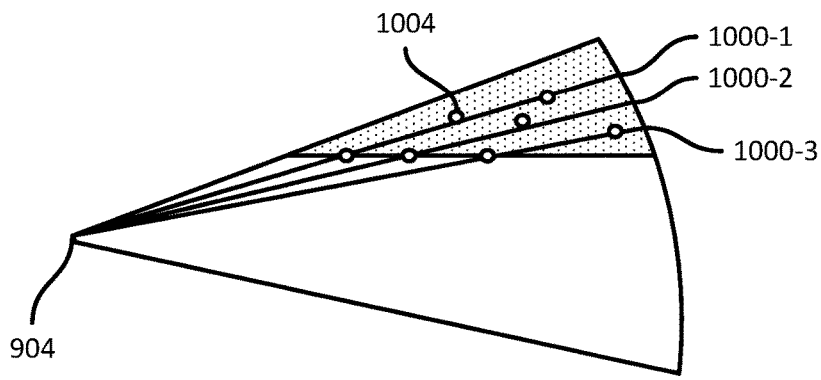
FIGS. 10A-10C illustrate an example performance of blocks 425 and 430 of the method of FIG. 4.
Figure 10B:
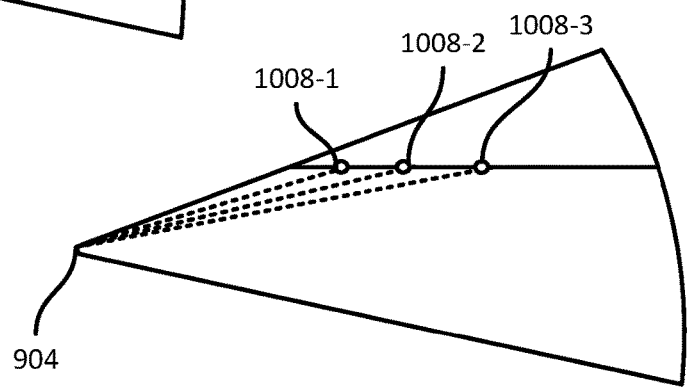

At block 425, the shelf plane generator 308 is configured to select local minima from the aisle subset, for use in the generation of a shelf plane at block 430. More specifically, turning to FIG. 10A, in the present example the shelf plane generator 308 is configured to generate a plurality of sampling planes 1000-1, 1000-2, 100-3 and so on, extending from the center location 904 at predefined angles through the aisle subset of depth measurements. For each sampling plane 1000, any depth measurements within a threshold distance of the sampling plane 1000 are projected onto the sampling plane. A plurality of depth measurements 1004 are shown in FIG. 10A as being within the above-mentioned threshold distance of the planes 1000. Further, as shown in FIG. 10B, for each sampling plane a single one of the measurements 1004 is selected, located closest to the location 904. Thus, three local minimum points 1008-1, 1008-2 and 1008-3 are shown as having been selected in FIG. 10B, with the remaining points in the aisle subset having been discarded.

Figure 10C:
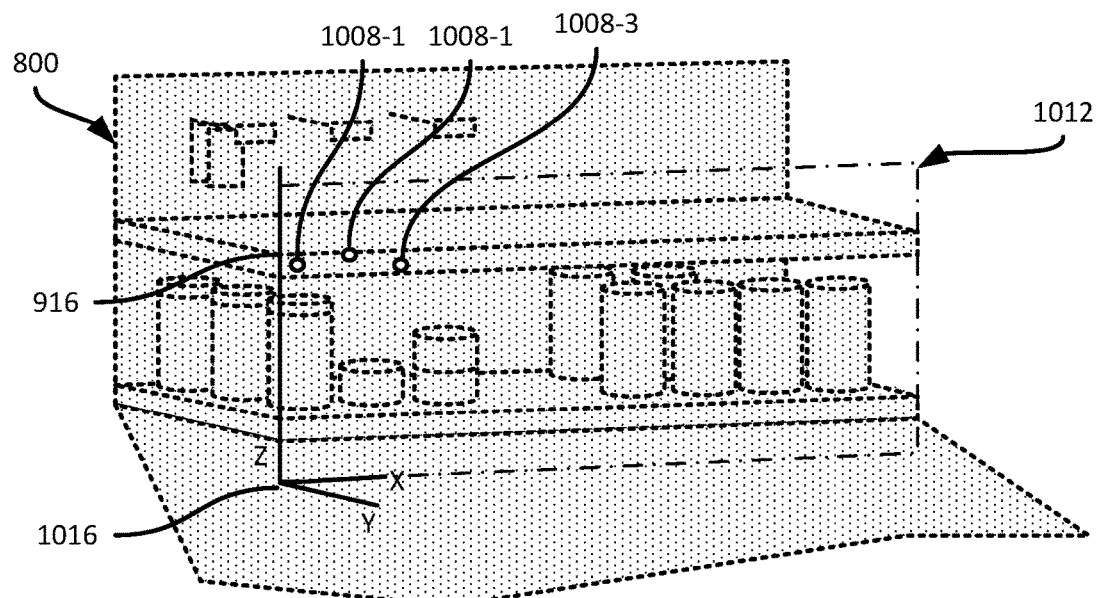

The shelf plane generator 308 is then configured to generate a shelf plane for the aisle 500 at block 430, by performing a suitable plane-fitting operation (e.g. a RANSAC operation) on the local minima selected at block 425. FIG. 10C illustrates the result of such a plane-fitting operation in the form of a shelf or aisle plane 1012 (the local minima 1008 noted above are also shown for illustrative purposes). The generation of the aisle plane at block 430 can include one or more validation operations. For example, constraints can be imposed on the plane-fitting operation, such as a requirement that the resulting aisle plane be substantially perpendicular to the ground plane mentioned earlier.

In some examples, constraints for use at block 430 can be generated from the image data 850 (i.e. independent of the depth measurements 800). In particular, in some examples the preprocessor 300 is configured, following data capture at block 405, to perform block 435. At block 435, the preprocessor 300 is configured to generate one or more shelf edges from the image data 850 according to a suitable edge-detection operation. An example of the above-mentioned edge-detection operation includes the conversion of the image data 850 to grayscale image data, and optionally the down-sampling of the image data 850. The preprocessor 300 can then be configured to apply, for example, a Sobel filter to the image data 850 to extract gradients (e.g. vertical gradients denoting horizontal edges) from the image data. The preprocessor 300 can then be configured to apply a Hough transform to the resulting gradients, to generate candidate shelf edge lines. As will be apparent to those skilled in the art, other shelf edge detection operations may also be employed at block 435, such as a Canny edge detector.

Having generated shelf edges (e.g. corresponding to the shelf edges 718-1 and 718-2 shown in FIG. 7), the preprocessor 300 can be configured to retrieve the positions (in the point cloud 800) of pixels in the image data 850 that lie on the shelf edges. The above-mentioned positions are then employed at block 430 to validate the aisle plane generated by the shelf plane generator 308. For example, the shelf plane generator 308 can be configured to verify that the aisle plane 1012 contains the points that lie on the shelf edges, or that such points lie within a threshold distance of the aisle plane 1012. In other examples, the preprocessor 300 is configured to fit a validation plane to the shelf edge points, and the shelf plane generator 308 is configured to apply the validation plane as a constraint during the generation of the aisle plane 1012 (e.g. as a requirement that the aisle plane 1012 must have an angle with the validation plane that is no greater than a predefined threshold). In further examples, the preprocessor 300 can be configured to validate the aisle plane by determining whether angles between the shelf edges themselves (e.g. the candidate shelf lines mentioned above) and the aisle plane 1012 exceed a threshold angle.

Returning to FIG. 4, at block 440 the localizer 316 is configured to update the localization of the apparatus 103 according to the corner edge 916 and the aisle plane 1012. As will now be apparent, the position and orientation of the apparatus 103 relative to the corner edge 916 and the aisle plane 1012 can be determined from the point cloud 800, without being subject to certain sources of error (e.g. inertial sensor drift, wheel slippage and the like) responsible for a portion of the deviation between the previous localization 600 and the true position of the apparatus 103. Therefore, Updating the localization of the apparatus 103 at block 440 includes, in the present example, initiating a local frame of reference having an origin that the intersection between the corner edge 916, the aisle plane 1012, and the above-mentioned ground plane. FIG. 10C illustrates a local frame of reference 1016, in which the aisle plane 1012 is the X-Z plane and the ground plane is the X-Y plane. The localizer 316 can therefore be configured to determine a position of the apparatus 103 in the frame of reference 1016. In further examples, the localizer 316 is configured to update the localization of the apparatus 103 by retrieving (e.g. from the map in the repository 232) a predefined true location of the endcap corner of the module 510-3 in the global frame of reference 102. The position and orientation of the apparatus 103 can then be determined in the global frame of reference 102 with the true location of the endcap corner of the module 510-3 and the position and orientation of the apparatus 103 relative to the corner edge 916 and aisle plane 1012.

Figure 11:
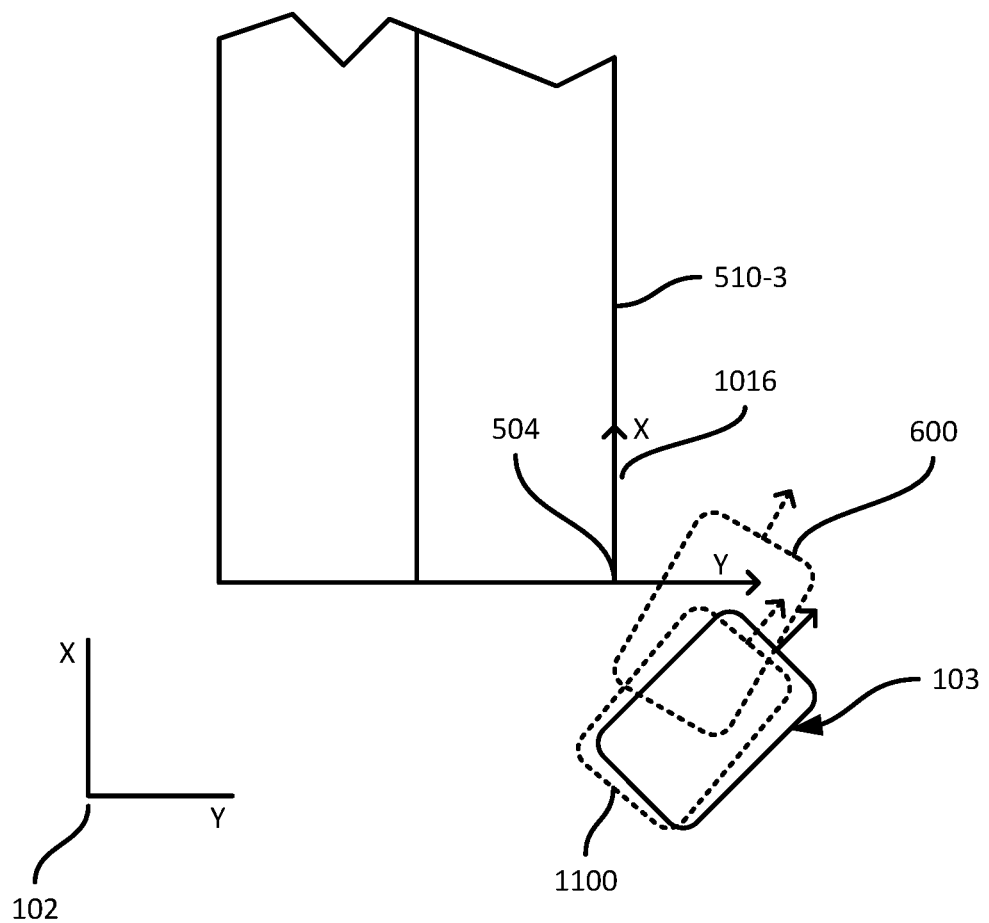
FIG. 11 illustrates an updated localization resulting from the performance of the method of FIG. 4.

Turning to FIG. 11, the previous localization 600 is illustrated, along with the true position of the apparatus 103 and an updated localization 1100 obtained via the performance of the method 400. The updated localization can also be configured to initialize or update a Kalman filter configured to accept as inputs inertial sensor data, wheel odometry, lidar odometry and the like, and to generate pose estimates for the apparatus 103.

Following the completion of the method 400, the apparatus 103 is configured to traverse the aisle 500, according to the data capture instruction noted above (received from the server 101). As will be apparent, during the traversal, additional error may accumulate in the localization obtained at block 440. The apparatus 103 is therefore configured to repeat the localization update process detailed above in connection with FIG. 4, with certain differences noted below.

Figure 12:
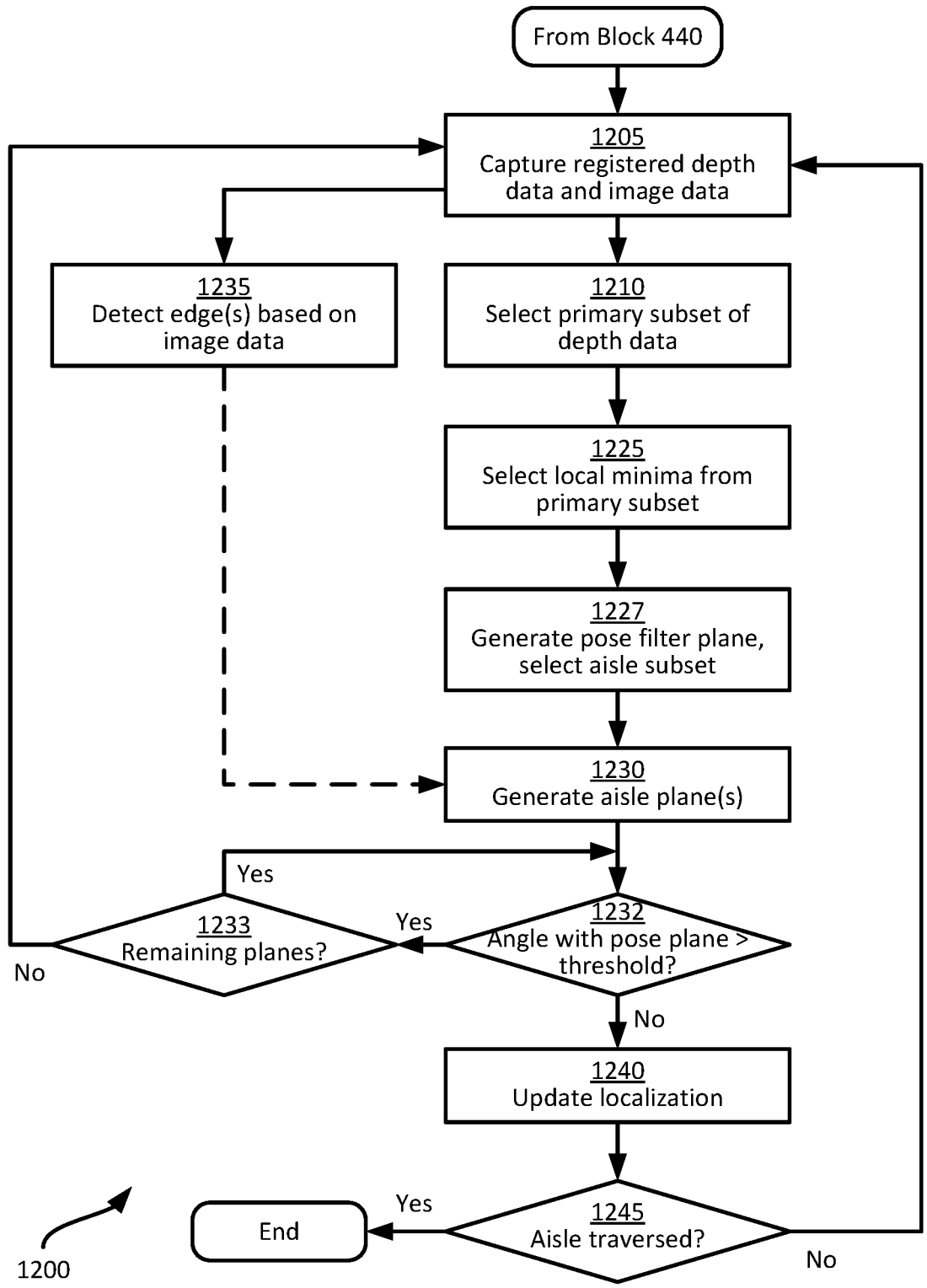
FIG. 12 is a flowchart of another method of localization for the mobile automation apparatus of FIG. 1.

FIG. 12 illustrates a method 1200 of updating localization during travel through an aisle (e.g. the aisle 500). The method 1200 may therefore be initiated following a performance of the method 400 at an entry to the aisle 500, as discussed above. Performance of the method 1200 includes the capture of depth and (optionally) image data at block 1205, the selection of a primary subset of the depth measurements at block 1210, and the selection of local minima from the primary subset at block 1225. The performance of blocks 1205, 1210 and 1225 are as described above in connection with blocks 405, 410 and 425 respectively. As will now be apparent, the detection of a corner via the generation of a corner edge is omitted in FIG. 12. The local minima selected at block 1225 are therefore selected from the entirety of the primary subset rather than from a portion of the primary subset as illustrated in FIG. 9D.

Figure 13:
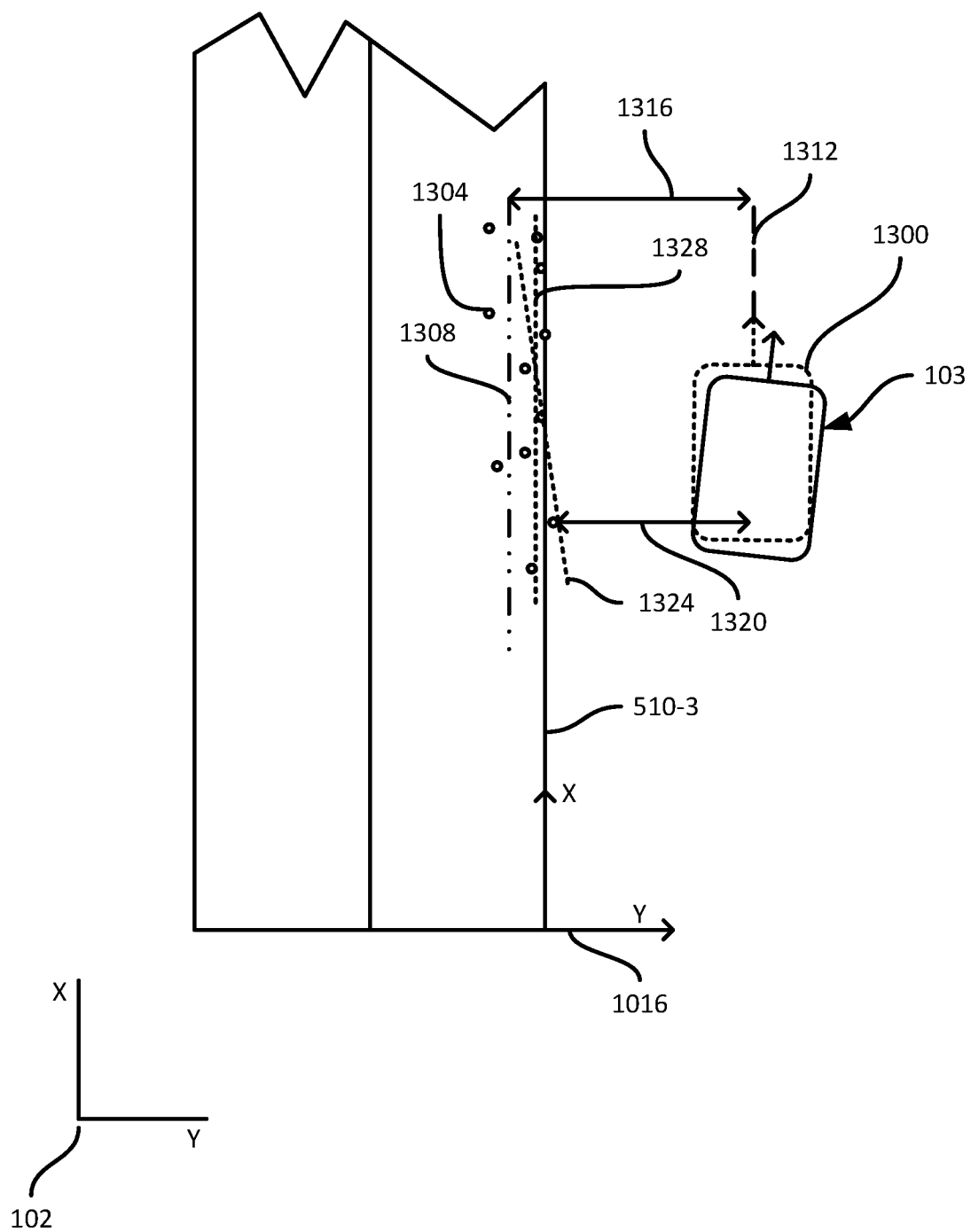
FIG. 13 illustrates an example performance of the method of FIG. 12.

Following the selection of local minima at block 1225, the apparatus 103 (and particularly the shelf plane generator 308) is configured to generate a pose filter plane and select an aisle subset of depth measurements based on the pose filter plane. Turning to FIG. 13, an example performance of block 1227 is discussed.

FIG. 13 depicts the true position of the apparatus 103 in solid lines, and the current localization 1300 of the apparatus 103. As will be apparent a certain amount of error has accumulated in the localization 1300. FIG. 13 also illustrates a plurality of local minimum points 1304 obtained via the performance of block 1225. Certain local minima may represent sensor noise, or depth measurements corresponding to products 712 on the shelf support surfaces 717. Therefore, the shelf plane generator 308 is configured to generate a pose filter plane 1308, and to select an aisle subset of the points 1304, containing the subset of the points 1304 that are located between the pose filter plane 1308 and a pose plane 1312 corresponding to the current (per the localization 1300) pose of the apparatus 103. The position of the pose filter plane 1308 is set according to a distance 1316 from the pose plane 1312. The distance 1316 can be predefined, or can be determined as a multiple (typically greater than one) of a distance 1320 between the closest point in the primary subset and the pose plane 1312. The factor itself may also be predetermined, or may be dynamically determined based on the angle of orientation of the apparatus 103 relative to the X axis of the local frame of reference 1016. For example, the factor can be configured to increase as the angle of orientation diverges from an angle of zero degrees.

Having generated the pose filter plane 1308 and selected the aisle subset of points at block 1227, the shelf plane generator 308 is configured to generate a shelf plane (also referred to herein as an aisle plane, as noted earlier) at block 1230 based on the aisle subset of the depth measurements. The performance of block 1230 is as described above in connection with block 430, and can include the use of image-derived shelf edges from block 1235 (which is as described in connection with block 435). Referring again to FIG. 13, two candidate aisle planes 1324 and 1328 are illustrated.

At block 1232, the shelf plane generator is configured select one of the planes 1324 and 1328 and to determine whether the angle of the selected plane relative to the pose filter plane 1308 (or the pose plane 1312, as the planes 1308 and 1312 are parallel to each other) exceeds a predetermined threshold. The determination at block 1232 reflects an assumption that although the localization 1300 may contain a certain degree of error, that error is not unbounded, and certain plane angles are therefore unlikely to correspond to true shelf planes. More specifically, the apparatus 103 is configured to traverse the aisle 500 remaining substantially parallel to the shelf edges 718 of the modules 510. Therefore, a plane generated at block 1230 that indicates that the apparatus 103 has deviated from the parallel orientation noted above beyond a threshold is unlikely to be a correctly fitted plane. The angular threshold can be, for example, about ten degrees. In the present example, therefore, the determination at block 1232 is affirmative for the plane 1324, and the performance of the method 1200 therefore proceeds to block 1233 to determine whether any planes remain to be assessed. If the determination is negative, the performance of the method 1200 begins again at block 1205.

Figure 14:
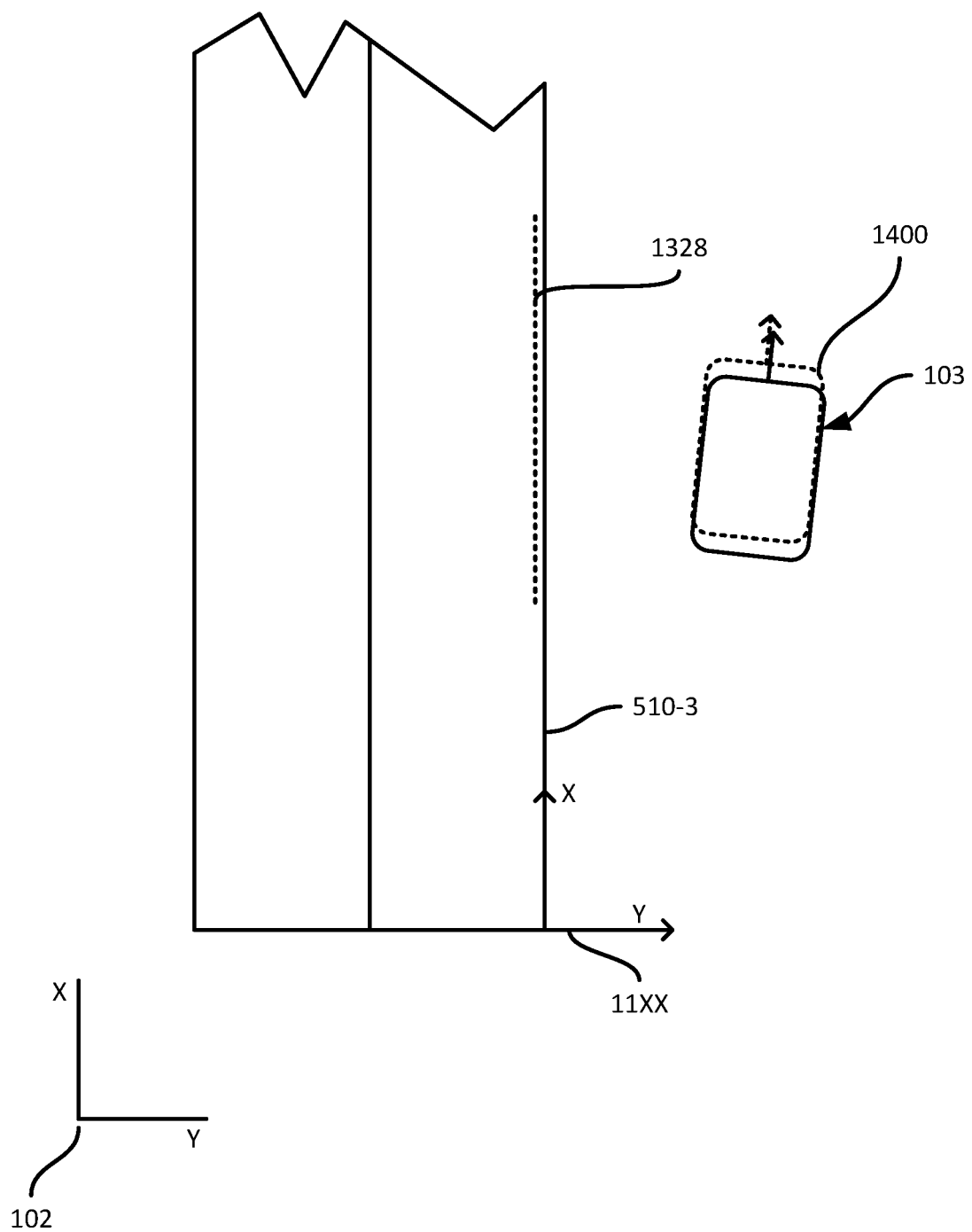
FIG. 14 illustrates an updated localization resulting from the performance of the method of FIG. 12.

When additional planes remain to be assessed, the performance of block 1232 is repeated for the next plane (in the present example, the plane 1328). As is evident from FIG. 13, the plane 1328 is substantially parallel to the pose plane 1312, and the determination at block 1232 is therefore negative. The plane 1328 is therefore selected as the aisle plane, and the localizer 316 is configured to update the localization of the apparatus 103 based on the aisle plane 1328. As will now be apparent, the aisle plane 1328 represents the detected location of the X-Z plane of the frame of reference 1016. Therefore, at block 1240 the localizer 316 can be configured to update the perceived orientation of the apparatus 103 relative to the X-Z plane based on the orientation of the aisle plane 1328 in the point cloud captured at block 1205. FIG. 14 illustrates an updated localization 1400 generated at block 1240, in which the orientation has been corrected relative to the localization 1300. As noted above in connection with block 440, the localizer 316 can also be configured to update the Kalman filter with the updated localization 1400.

Returning to FIG. 12, at block 1245, the apparatus 103 is configured to determine whether the aisle 500 has been fully traversed, based on the updated localization. The determination at block 1245 can be based on either the local frame of reference 1016 or the global frame of reference 102, as the length of the aisle 500 is known from the map. When the determination at block 1245 is negative, the performance of the method 1200 is repeated as the apparatus 103 continues to traverse the aisle 500. When the determination at block 1245 is affirmative, the performance of the method 1200 terminates.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of mobile automation apparatus localization in a navigation controller, the method comprising:
controlling a depth sensor to capture a plurality of depth measurements corresponding to an area containing a navigational structure;
selecting a primary subset of the depth measurements;
selecting, from the primary subset, a corner candidate subset of the depth measurements;
generating, from the corner candidate subset, a corner edge corresponding to the navigational structure;
selecting an aisle subset of the depth measurements from the primary subset, according to the corner edge;
selecting, from the aisle subset, a local minimum depth measurement for each of a plurality of sampling planes extending from the depth sensor;
generating a shelf plane from the local minimum depth measurements; and
updating a localization of the mobile automation apparatus based on the corner edge and the shelf plane.

2. The method of claim 1, further comprising, prior to capturing the depth measurements:
receiving an instruction to traverse an aisle associated with the navigational structure;
retrieving a location of the navigational structure in a global frame of reference; and
controlling a locomotive mechanism of the mobile automation apparatus to travel to the location.

3. The method of claim 1, wherein selecting the primary subset comprises generating a primary selection region centered on the depth sensor, and selecting the depth measurements within the primary selection region.

4. The method of claim 3, wherein the primary selection region is a cylinder.

5. The method of claim 1, wherein selecting the aisle subset comprises dividing the primary subset into two portions according to the corner edge, and selecting one of the portions.

6. The method of claim 1, wherein updating the localization includes initializing a local frame of reference having an origin based on the corner edge and the shelf plane.

7. The method of claim 1, further comprising: providing the updated localization to a Kalman filter.

8. The method of claim 1, further comprising:
capturing image data with the depth measurements;
detecting a shelf edge in the image data; and
validating the shelf plane according to the shelf edge.

9. The method of claim 2, further comprising:
initiating a traversal of the aisle;
controlling the depth sensor to capture a further plurality of depth measurements;
selecting a further primary subset of depth measurements from the further plurality of depth measurements;
selecting a further aisle subset of the depth measurements from the further primary subset;
generating a further shelf plane based on the further aisle subset; and
further updating the localization based on the further shelf plane.

10. The method of claim 9, further comprising:
determining an angle of the further shelf plane relative to a pose plane of the mobile automation apparatus; and
discarding the further shelf plane if the angle exceeds a threshold.

11. A computing device for mobile automation apparatus localization, comprising:
a depth sensor;
a navigational controller configured to:
control the depth sensor to capture a plurality of depth measurements corresponding to an area containing a navigational structure;
select a primary subset of the depth measurements;
select, from the primary subset, a corner candidate subset of the depth measurements;
generate, from the corner candidate subset, a corner edge corresponding to the navigational structure;
select an aisle subset of the depth measurements from the primary subset, according to the corner edge;
select, from the aisle subset, a local minimum depth measurement for each of a plurality of sampling planes extending from the depth sensor;
generate a shelf plane from the local minimum depth measurements; and
update a localization of the mobile automation apparatus based on the corner edge and the shelf plane.

12. The computing device of claim 11, wherein the navigational controller is further configured, prior to controlling the depth sensor to capture the depth measurements:
receive an instruction to traverse an aisle associated with the navigational structure;
retrieve a location of the navigational structure in a global frame of reference; and control a locomotive mechanism of the mobile automation apparatus to travel to the location.

13. The computing device of claim 11, wherein the navigational controller is further configured to select the primary subset by:
generating a primary selection region centered on the depth sensor; and
selecting the depth measurements within the primary selection region.

14. The computing device of claim 13, wherein the primary selection region is a cylinder.

15. The computing device of claim 11, wherein the navigational controller is further configured to select the aisle subset by dividing the primary subset into two portions according to the corner edge, and selecting one of the portions.

16. The computing device of claim 11, wherein the navigational controller is further configured to update the localization by initializing a local frame of reference having an origin based on the corner edge and the shelf plane.

17. The computing device of claim 11, wherein the navigational controller is further configured to provide the updated localization to a Kalman filter.

18. The computing device of claim 11, wherein the navigational controller is further configured to:
control the image sensor to capture image data with the depth measurements;
detect a shelf edge in the image data; and
validate the shelf plane according to the shelf edge.

19. The computing device of claim 12, wherein the navigational controller is further configured to:
initiate a traversal of the aisle;
control the depth sensor to capture a further plurality of depth measurements;
select a further primary subset of depth measurements from the further plurality of depth measurements;
select a further aisle subset of the depth measurements from the further primary subset;
generate a further shelf plane based on the further aisle subset; and
further update the localization based on the further shelf plane.

20. The computing device of claim 19, wherein the navigational controller is further configured to:
determine an angle of the further shelf plane relative to a pose plane of the mobile automation apparatus; and
discard the further shelf plane if the angle exceeds a threshold.

* * * * *